United States Patent
Nawab et al.

(10) Patent No.: US 12,387,271 B2
(45) Date of Patent: Aug. 12, 2025

(54) REDUCING NETWORK TRAFFIC ASSOCIATED WITH GENERATING EVENT PREDICTIONS BASED ON COGNITIVE IMAGE ANALYSIS SYSTEMS AND METHODS

(71) Applicant: ExlService Holdings, Inc., New York, NY (US)

(72) Inventors: Rahul Nawab, Ahmedabad (IN); Namit Chopra, Delhi (IN); Saurabh Kushwaha, Bhopal (IN); Saish Dattana, Atlanta, GA (US); Siddharth Garg, Kanpur (IN)

(73) Assignee: ExlService Holdings, Inc., New York, NY (US)

( * ) Notice: Subject to any disclaimer, the term of this patent is extended or adjusted under 35 U.S.C. 154(b) by 241 days.

(21) Appl. No.: 18/110,629

(22) Filed: Feb. 16, 2023

(65) Prior Publication Data
US 2023/0260045 A1    Aug. 17, 2023

Related U.S. Application Data

(60) Provisional application No. 63/310,969, filed on Feb. 16, 2022.

(51) Int. Cl.
*G06Q 40/08* (2012.01)
*G06V 10/82* (2022.01)
*G06V 20/10* (2022.01)

(52) U.S. Cl.
CPC ............. *G06Q 40/08* (2013.01); *G06V 10/82* (2022.01); *G06V 20/176* (2022.01)

(58) Field of Classification Search
None
See application file for complete search history.

(56) References Cited

U.S. PATENT DOCUMENTS

2016/0063387 A1* 3/2016 Srivastava ............. G06N 5/048
                                                    709/204
2021/0383481 A1* 12/2021 Richardson .......... G06V 20/176
(Continued)

OTHER PUBLICATIONS

"GEOX Property: Accurate 3D Property Attributes For Gaining Insurer's Competitive Edge"; Peverelli et al.; Nov. 6, 2020. (Year: 2020).*

(Continued)

*Primary Examiner* — John A Pauls
(74) *Attorney, Agent, or Firm* — Perkins Coie LLP

(57) ABSTRACT

Systems and methods for reducing network traffic associated with generating event predictions based on cognitive image analysis are disclosed. The system receives a user input indicating a location identifier of a location of interest. The system queries a data store to determine whether an image associated with the location of interest satisfies a data recency criterion. In response to the image failing to satisfy the data recency criterion, the system queries a remote data store to determine whether another, additional image associated with the location of interest satisfies the data recency criterion. In response to the additional image satisfying the data recency criterion, the system extracts one or more image-based attributes of the additional image and determines a distance between objects of the image. The system generates an event prediction based on the image-based attributes, the distance, and location-based attributes using a machine learning model to be displayed.

20 Claims, 18 Drawing Sheets

(56) References Cited

U.S. PATENT DOCUMENTS

2021/0398289 A1\* 12/2021 Schmidt .................... G06T 7/13
2022/0405856 A1\* 12/2022 Hedges ................ G06Q 50/163
2024/0233030 A1\* 7/2024 Menon ................... G06Q 50/16

OTHER PUBLICATIONS

"Property Insurers: Are you eyeing for a data based competitive advantage?"; GEOX Analytics; Nov. 19, 2020. (Year: 2020).\*

\* cited by examiner

FIRE Peril – Frequency Model
*Analysis of Predictors*

Property Specific Attributes — 512

Policy Details — 514

| Policy Number | Address |
|---|---|
| P859 | 5 Hill Field Ave, El Paso |
| Date of Inception | Renewal Due on |
| 20-May-19 | 20-May-22 |

Claim Details — 518

| Last Claim$ | Last Claim$ |
|---|---|
| 37K | 24K |
| Last Claim Filed Date | Claim Closed Date |
| 05-Oct-20 | 05-Jan-21 |

Latest Record — 520
Past Record — 522

Property Attributes — 516

| Roof Type | Roof Condition | Final Score |
|---|---|---|
| Flat | Good (Current) / Good (Past) | Very High (Current) / Very High (Past) |
| Area | Tree Overhang category | Tree Overhang |
| 113.33 | 4 (Current) / 1 (Past) | 0.75 (Current) / 0.09 (Past) |
| Roof Material | Distance to Vegetation | Distance to Fire Station |
| Concrete | 0.83 | 22.33 |
| Distance to Vegetation Category | Distance to Trees | Distance to Closest Building |
| Low | 3.13 | 4.60 |

*FIG. 5B*

REDUCING NETWORK TRAFFIC ASSOCIATED WITH GENERATING EVENT PREDICTIONS BASED ON COGNITIVE IMAGE ANALYSIS SYSTEMS AND METHODS

CROSS-REFERENCE TO RELATED APPLICATIONS

This application claims benefit under 35 U.S.C. § 119(e) to U.S. Provisional Patent Application No. 63/310,969, filed Feb. 16, 2022, the entirety of which is hereby incorporated by reference herein.

BACKGROUND

When determining whether a property is at risk for a natural disaster or other environmental-related event, an inspector or surveyor may inspect a property for indicators that may leave the property prone to the occurrence of such disaster. This often involves research conducted on the property and/or a survey of one or more structures on the property to determine whether the property is at risk. Although the research may aid an inspector in determining various risks of a disaster occurring at the property, the final decision is often based on a qualitative assessment made by the inspector. This leads to inaccurate inspection results, variability in the amount of research resources used and their usefulness, and a lack of uniformity in evaluation techniques.

BRIEF DESCRIPTION OF THE DRAWINGS

FIGS. 5A-5C show example system user interfaces displaying information associated with event predictions, in accordance with some implementations of the present technology.

Figure 1:
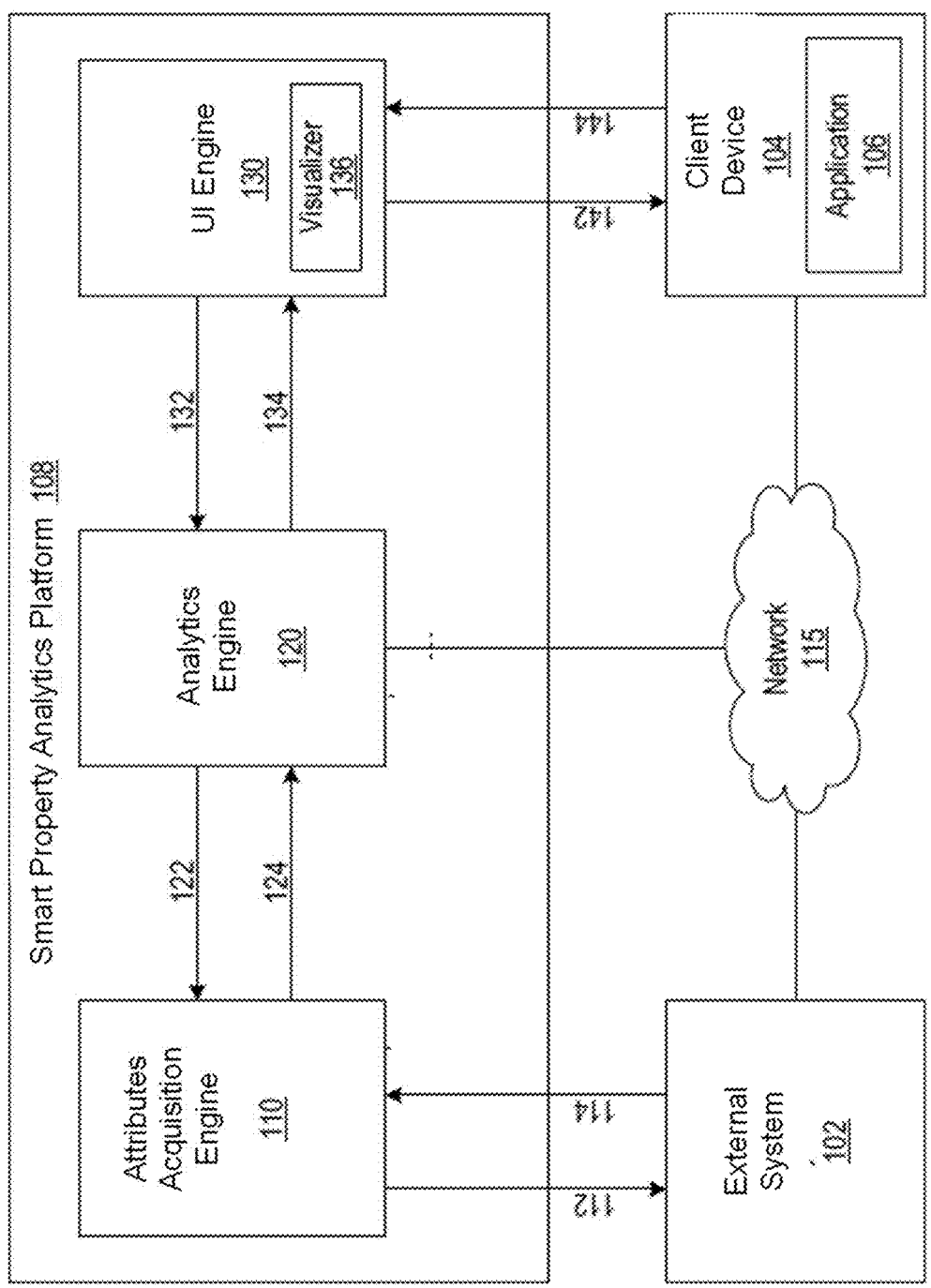
FIG. 1 is a block diagram showing a smart property analytics platform, in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Inspectors, surveyors, and other agents conduct property inspections to determine whether a property is at risk for a given environmental event. This leaves the inspector prone to an accident, such as by climbing a roof, crawling into a crawl space, or inspecting high-voltage electrical boxes, and leads to inaccurate inspection results as such inspections rely so heavily on an inspector's qualitative opinion. Aerial imaging systems are sometimes used to automate and/or supplement manual inspections. When imaging systems are used, it is not feasible to recapture aerial images when it is determined that a given aerial image is outdated (e.g., by dispatching an unmanned aerial vehicle to a property every time a given image is out of date). Accordingly, service providers may perform integrations with third-party aerial imagery provider systems to obtain previously captured aerial images. System interface messages used to acquire aerial image data are substantially larger in size than text-based messages, which increases network traffic and decreases the amount of network bandwidth available for other operations. Accordingly, service providers can forgo the use of aerial imagery altogether, which results in inaccuracies in estimating damages of a property. A need therefore exists for an optimized system that uses machine learning-based image analytics to determine whether a property is at risk for a particular disaster and also facilitates a reduction in the amount of network traffic associated with acquiring the digital images needed to evaluate prospective insured properties.

To overcome these and other deficiencies of existing systems, the inventors have developed a system for reducing network traffic associated with generating event predictions based on cognitive image analysis. For instance, the inventors have developed a system utilizing a specialized model that can generate, from (i) one or more image-based attributes associated with a location of interest, (ii) distances between objects of interest within an image associated with the location of interest, and (iii) a set of location attributes associated with the location of interest, an event prediction. For example, the event prediction can be associated with an environmental event or other prediction related to a potential issue associated with the location of interest. Prior to generating the event prediction, the system can determine whether an image associated with a location of interest is available at a local data store before querying a remote data store (e.g., via the Internet) to reduce the amount of network traffic associated with generating such event predictions. Furthermore, prior to generating the event prediction, the system can extract the one or more image-based attributes associated with the location of interest using a cognitive image analysis model, thereby increasing the speed and accuracy at which event predictions or other predictions are generated. Moreover, by determining distances between objects of interest within an image of the location of interest, the system improves the accuracy of machine learning-based event prediction models and bolsters the available data used to generate the event predictions while eliminating the need for an inspector to provide a recommendation based on a qualitative opinion.

In some implementations, the system improves the accuracy of output and predictions by optimizing and/or pre-processing raw input data to make the data usable for machine learning models. Pre-processing and/or optimization operations can include generating or updating any of keyword sets used by the models. In some implementations, pre-processing and/or optimization operations can include generating object labels based on object detection. In some implementations, pre-processing and/or optimization operations can include generating distance labels based on determining distances between objects of interest within images. In some implementations, pre-processing and/or optimization operations can include generating terms and/or phrases using natural language processing (NLP).

In various implementations, the methods and systems described herein can reduce network traffic associated with generating event predictions based on cognitive image analysis. For example, the system can receive a user input at a graphical user interface (GUI) indicating a location identifier of a location of interest. A first data store is queried based on the location identifier to determine whether at least one image of a set of images associated with the location of interest satisfies a data recency criterion. In response to a determination that the at least one image of the set of images associated with the location of interest fails to satisfy the data recency criterion, a remote data store is queried based on the location identifier to determine whether at least one image of a different set of images associated with the location of interest satisfies the data recency criterion. In response to the at least one image of the different set of images associated with the location of interest satisfying the data recency criterion, the system extracts, by a first machine learning model, one or more image-based attributes from the at least one image of the different set of images associated with the location of interest. The system determines, by a second machine learning model, a distance between a first object of the at least one image of the different set of images and a second object of the at least one image of the different set of images. The system causes a third machine learning model to generate an event prediction, by providing (i) the one or more image based attributes, (ii) the distance, and (iii) a set of location attributes associated with the location of interest to the third machine learning model, where the event prediction is associated with an environmental event. The system generates and displays, at the GUI, information associated with the event prediction.

In the following description, for the purposes of explanation, numerous specific details are set forth in order to provide a thorough understanding of implantations of the present technology. It will be apparent, however, to one skilled in the art that implementation of the present technology can practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Smart Property Analytics Platform

FIG. 1 is a block diagram showing a computing environment 100. As a general overview, the computing environment 100 can enable users, such as users that operate one or more client devices 104, to access resources (e.g., data, visualizers, other computer-executable code, and/or the like) on a particular instance of a smart property analytics platform 108. An example user can be an end-user such as an insurance provider, insurance policy underwriter, an inspector, a surveyor, an insurance adjuster, an insurance claim representative, or other user. As an example, an inspector can view insurance-related predictions regarding a property to be inspected to determine whether the property is at risk for a disaster, such as a flood, fire, storm, or other disaster. The smart property analytics platform 108 can source insurance-related data from a plurality of external computing systems 102, perform data cleansing operations to optimize the sourced data, perform application-specific modeling operations to structure and feed data to visualizers, and provide the relevant visualizers to client device 104.

The smart property analytics platform 108 can include dedicated and/or shared (multi-tenant) components and can be implemented, at least in part, as a virtual or cloud-based environment. For example, in some embodiments, the smart property analytics platform 108 can host and/or manage a subscriber-specific application instance, shown as the application 106 provided to a client device 104. Accordingly, the smart property analytics platform 108 can allow subscriber entities to execute computer-based code without provisioning or managing infrastructure, such as memory devices, processors, and the like. In some embodiments, the computing resources needed for a particular computing operation can be assigned at runtime.

The smart property analytics platform 108 can include various engines. As used herein, the term "engine" refers to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations as defined by parametrized functions, specific configuration settings, special-purpose code, and/or the like.

The engines described herein can include machine learning models, which refer to computer-executable instructions, in compiled or executable form, structured to facilitate machine learning/artificial intelligence (ML/AI) operations. Machine learning models can include one or more convolutional neural networks (CNN), deep learning (DL) models, translational models, natural language processing (NLP) models, computer vision-based models, or any other suitable models for enabling the operations described herein.

The engines described herein can include visualizers. For example, the user interface (UI) engine 130 can include product visualizers, prediction visualizers, graph data visualizers, multimedia visualizers, and/or the like. The user interface (UI) engine 130 is structured to apply specific modeling algorithms and deliver the data, via various visualizers 136, to the client device 104. Visualizers can be thought of as computer-based entities that enable user access and interaction with the analytical tools provided by the smart property analytics platform 108.

An example visualizer can include a configurable presentation layer, one or more data structures, computer-executable code, and event handlers. The configurable presentation layer can display, in an interactive fashion, graphs, charts, images and/or the like. For example, a graph data visualizer can use data processed by analytics engine 120 to provide one or more insurance-related data in the form of a graph. As an example, the graph data visualizer can generate a geographic map of an area with color-coded regions within the geographic map indicating a distribution of insurance claims with respect to a given disaster (e.g., storm, flood, fire, tornado, earthquake). As another example, the graph data visualizer can generate a geographic map of an area with color-coded regions within the geographic map indicating a distribution of the average severity (e.g., cost) of an insurance claim with respect to a given disaster. As yet another example, the graph data visualizer can generate one or more other graphs that are related to attributes of a property (e.g., tree overhang, roof quality, number of windows, distance to an object of interest, or other attributes) with respect to a geographic area that may indicate an number of claims for that geographic area and/or the cost associated with such claims. Additionally, such examples can include an average or weighted average value with respect to at least one of a geographic area, disaster, insurance coverages, or other data. It should be noted that other suitable graphs generated can be generated, in accordance with some implementations of the present technology. One of skill will appreciate that computer-executable code included in visualizers is not limited to generating visual presentations of data and can be structured to retrieve and/or generate the relevant data, receive and process user inputs, and/or the like.

Moreover, prediction visualizers can use data processed by analytics engine 120 to provide one or more insurance-related data regarding a property. For example, the prediction visualizer can be configured to present insurance policy details, claim details, property attributes, images associated with the property, predictions of whether the property is prone to a disaster (risk scores, severity scores, frequency scores), predictions related to attributes of the property (e.g., roof condition, building materials, location information, distances to objects of interest, distances between residence features associated with the location of interest), or other insurance-related data. Additionally, the prediction visualizers can use data processed by analytics engine 120 to present such information with respect to multiple properties or multiple geographic areas.

In operation, the attributes acquisition engine 110 of the smart property analytics platform 108 is configured to receive and/or access data from one or more external systems 102. In some implementations, the attributes acquisition engine 110 generates a raw data query 112 and transmits the raw data query 112 to a particular external system 102. In some implementations, the attributes acquisition engine 110 includes a web crawler, a web scraper, or a similar component that returns and retrievably stores raw data from the relevant systems. In such cases, the raw data query 112 is executed against a data store within the smart property analytics platform 108 to extract the relevant variables and information from the raw data.

The raw data query is parametrized based on information included in a configuration resource (e.g., a file, database, computer-executable script). The configuration resource can include categorization and/or parameter information, such as an external system 102 Uniform Resource Locator (URL) (an API or another interface engine URL), a search keyword (e.g., a location identifier of a property, Global Positioning System (GPS) coordinates of a property), a time-related parameter (e.g., for sourcing images from property image databases), and/or the like. Data is sourced from external systems 102. One example of an external system 102 is an imagery database, such as GEOX®. The data collected, at 114, from the imagery database can be current or historical images related to a property (e.g., satellite imagery of a home associated with a property, a geographic area (e.g., a county, city, state), or other images. Another example of an external system 102 is a weather database, such as Climate Data Online®. The data collected, at 114, from the weather database can be historical weather conditions, historical environmental data, or other weather-related event information. Other examples of external systems 102 include one or more data stores that retrievably store usage information regarding the smart property analytics platform 108, such as, company internal channels, insurance claims data, insurance policy data, crowdsourced information stores, and/or the like.

In some implementations, the attributes acquisition engine 110 performs data pre-processing to optimize the data collected at 114 prior to feeding the optimized data to the analytics engine 120. Additionally, in some implementations, the attributes acquisition engine 110 performs pre-processing to optimize data collected at a local data store associated with the smart property analytics platform 108 prior to feeding the optimized data to the analytics engine 120. Optimization operations can include generating or updating, based on the data collected at 114, any of a keyword set for an AI/ML component of the analytics engine 120, labels, object labels based on object detection, distance labels based on determining distances between objects of interest within images, terms or phrases based on natural language processing (NLP), and/or the like. These items can be stored in a data store associated with the smart property analytics platform 108 and provided as data inputs 124 to the analytics engine 120. In some embodiments, the attributes acquisition engine 110 provides the data inputs 124 to the analytics engine 120 in a push fashion. In some embodiments, the attributes acquisition engine 110 provides the data inputs 124 to the analytics engine 120 in response to a query 122 received from the analytics engine 120.

The analytics engine 120 is structured to determine, based on the data inputs 124, one or more event predictions. The analytics engine 120 can utilize suitable statistical and/or AI/ML analysis tools, such as time series analysis, rank and compare, overlap analysis, and the like. As another example, the analytics engine 120 can include multiple machine learning models. For instance, the analytics engine 120 can include an object recognition model, cognitive image analysis model, prediction model, or other machine learning models. The event predictions generated by the analytics engine 120 can include one or more insurance-related event properties, such as predicted disaster severity, predicted disaster frequency, predicted disaster risk, and/or other related predictions.

Methods of Operation of a Smart Property Analytics Platform

Figure 2A:
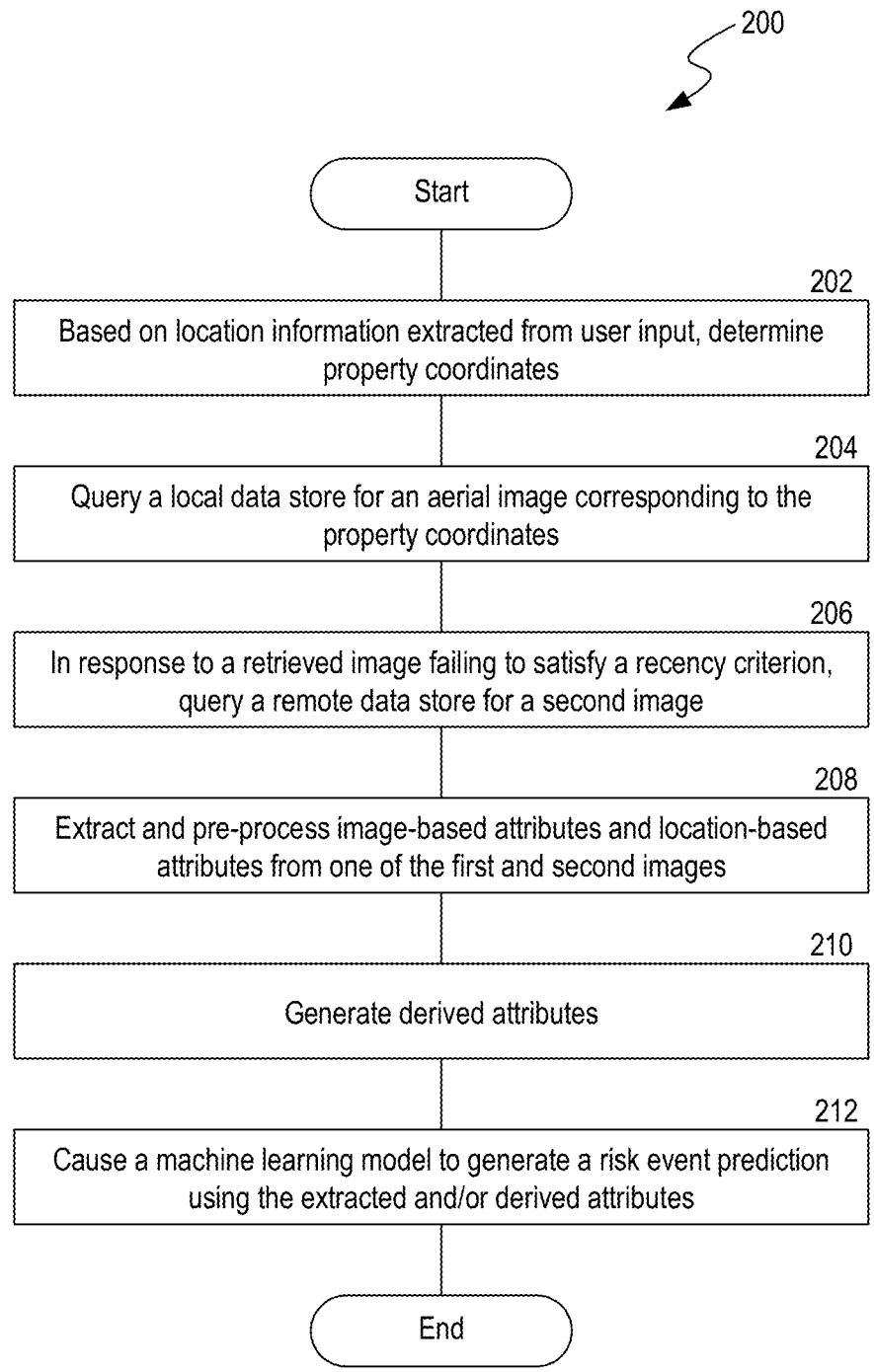
FIGS. 2A-2B are flowcharts showing processes of reducing network traffic associated with generating event predictions based on cognitive image analysis, in accordance with some implementations of the present technology.

FIG. 2A is a flowchart showing a process for reducing network traffic associated with generating insurance-related event predictions based on cognitive image analysis, in accordance with some implementations of the present technology. In an example implementation, process 200 can be performed by the smart property analytics platform 108 shown in FIG. 1. However, one of skill will appreciate that process 200 can be performed, in whole or in part, on another suitable computing device, such as the external system 102 and/or the client device 104. Furthermore, the features of various machine learning models described herein can be omitted and/or combined to reduce the number of machine learning models.

At 202, process 200 can determine a location identifier. For example, process 200 can receive, at a graphical user interface (GUI), a user input indicating a location identifier of a location of interest. To that end, a GUI can be generated and displayed to enable the user to indicate a location of interest. The user can provide a location identifier to an input component of the GUI, and process 200 can determine the location of interest based on the location identifier. The location identifier may include an address, county, city, state, zip code, geographic coordinates (e.g., longitude, latitude), coordinates sufficient to define a bounding box describing a geographical boundary indicated by a user on a pop-up map presented by the GUI, or other location identifier.

In some implementations, process 200 can extract location information from the user input. For example, where the user input is an address of a property, process 200 can extract location information such as the street, house number, apartment number, county, city, state, and zip code using natural language processing. Process 200 can determine coordinates associated with the property based on the location information extracted from the user input. For example, process 200 can query one or more local databases to determine whether the address is associated with a customer. For instance, the smart property analytics platform 108 (FIG. 1) can be associated with one or more databases storing customer information. The customer information can include demographic information, financial information, name, address, insurance policy details, insurance claim details, property information (e.g., type of property the customer owns, GPS coordinates associated with the property, attributes of the property), or other customer-related information. Process 200 can query such database, for example, by using the location information, to determine the GPS coordinates associated with the property. In this manner, network traffic is reduced when generating event predictions as the system obtains location information from a local data store, as opposed to resorting to obtaining such location information from a remote data store via a computing network. Additionally, in this manner, the system obtains the most accurate information regarding the location of a property, thereby enabling accurate generation of event predictions.

In some implementations, if the database does not return GPS coordinates (e.g., the GPS coordinates may not be available), process 200 can query an external data store. For instance, the smart property analytics platform 108 (FIG. 1) can be associated with one or more external systems (e.g., external system 102 (FIG. 1)), which can be associated with one or more remote data stores. As such, process 200 can query a remote data store, such as Google Earth®, to determine GPS coordinates associated with the property. For example, process 200 can query the remote data store using the location information extracted from the user input to obtain the GPS coordinates associated with the property. In this manner, the system obtains accurate location information to increase the accuracy of event predictions.

At 204, process 200 can determine whether an image associated with the location of interest satisfies a data recency criterion. For example, process 200 can query a local data store based on the location identifier, the location information, or the GPS coordinates to obtain an image associated with the location of interest. In some implementations, the local data store can store a set of images associated with the location of interest (e.g., the property). For example, the set of images can be aerial imagery corresponding to the location of the property, such as the GPS coordinates of the property, the address of the property, or other location information of the property. Each image of the set of images can be associated with a data recency value. For instance, the data recency value can indicate a timestamp or date indicating when the image was captured. Process 200 can obtain at least one image (e.g., of the set of images) associated with the location of interest that satisfies a data recency criterion. For instance, to ensure that the system uses the most up-to-date images associated with a property, the system can determine whether an image (or images) associated with the property is up-to-date. As the local data store can store historical and current images associated with the location of interest, process 200 can compare each image of the set of images associated with the property to the data recency criterion to ensure that the obtained images are not out-of-date. In some implementations, process 200 can obtain the most recent image of the location of interest to ensure data accuracy.

The data recency criterion can be a predetermined value. For example, the data recency criterion can be a range of dates, a number of days, a number of months, a number of years, or other recency criterion. Process 200 can parse images in the set of images associated with the property of interest and compare the data recency value of a respective image to the data recency criterion. For example, where the data recency criterion is a number of days, such as 10 days, process 200 can compare the data recency value of each image of the set of images associated with the property of interest to determine whether the data recency criterion is satisfied. The data recency criterion can be satisfied where the data recency value of associated with an image is at or within the range of the data recency criterion. Continuing with the above example, if an image associated with the property is associated with a date of Jan. 20, 2023 and the data recency criterion is 10 days, the data recency criterion is satisfied (e.g., where the current date is Jan. 22, 2023). As such, where the data recency criterion indicates a number of minutes, hours, days, months, years, or other number, process 200 can compare the current date (e.g., as obtained by a timekeeping element associated with the smart property analytics platform 108 (FIG. 1)) to the data recency value of an image associated with the property of interest to determine whether a difference between the current date and the data recency value is within the data recency criterion. In some implementations, to improve the accuracy of model predictions, the data recency criterion can be dynamically determined based on a suitable parameter or a combination thereof, such as property address, coordinate range, zip code, residential zoning code, risk score, recent history of insurance events, proximity of known hazards to the property, etc. For example, a relatively higher previously determined risk score can result in a heightened data recency threshold to minimize the possibility of images used for analytics being out of date.

At 206, process 200 can query a remote data store for a second image. For example, in response to a determination that the at least one image of the set of images associated with the location of interest fails to satisfy the data recency criterion, process 200 can query a remote data store for a second image. As the local data store may not have an up-to-date image associated with the property of interest, the system queries a remote data store to obtain an up-to-date image. For example, process 200 can query a remote data store (e.g., GEOX®) based on the location identifier to determine whether at least one image of a set of images stored at the remote data store associated with the location of interest satisfies the data recency criterion. The remote data store can store images associated with the location of interest, such as aerial imagery of a property associated with the location of interest, imagery of the surrounding environment associated with the location of interest (e.g., the county, city, state, or country associated with the location of interest) or other imagery. Each image stored in the remote data store can be associated with a second data recency value, indicating a timestamp or date of when a respective image was captured.

In some implementations, process 200 can query the remote data store using the coordinates obtained in 202.

Similar to the process described in 204, process 200 can query the remote data store to determine whether an image associated with the location of interest satisfies the data recency criterion. The remote data store may provide process 200 with at least one image satisfying the data recency criterion. Additionally, in some implementations, where the remote data store provides multiple images satisfying the data recency criterion, process 200 can parse through each obtained image and select the most recent image with respect to the provided images. In this manner, the system reduces the amount of network traffic associated with generating event predictions by querying a remote data base when no up-to-date images associated with the location of interest are stored at the local database. Moreover, in this manner, the system improves the user experience and ensures the most accurate event predictions can be generated by obtaining the most recent images associated with the location of interest.

At 208, process 200 can extract and pre-process attributes associated with the location of interest. For example, process 200 can extract and pre-process image-based attributes associated with the location of interest, location-based attributes associated with the location of interest, and other attributes associated with the location of interest. For example, process 200 can, in response to the at least one image of the set of images associated with the location of interest (e.g., as obtained in 206) satisfying the data recency criterion, extract, by a first machine learning model, one or more image-based attributes from the at least one image of the set of images associated with the location of interest. In some implementations, the first machine learning model can be a cognitive image analysis model. For example, the cognitive image analysis model can be configured to extract one or more image-based attributes from the obtained image. The one or more image-based attributes can include attributes associated with the location (e.g., the property) of interest such as a number of windows, a number of doors, a number of lights, type of roofing material (e.g., clay, asphalt, shingle), type of siding (e.g., vinyl, shiplap, wood), structures associated with the location (e.g., a shed, detached garage, barn), a number of gas tanks, number of chimneys, height, width, length of the property, lot size of the property, vegetation associated with the property, a body of water associated with the property, or other attributes that may be extracted from an image of the location of interest. By extracting image-based attributes associated with the property, the system prepares input data for a machine learning model to generate robust event predictions, thereby improving the accuracy of the model.

At 210, process 200 can generate derived attributes. For example, process 200 can determining, by a second machine learning model, derived attributes using the obtained image (e.g., the image obtained in 206). In some implementations, the second machine learning model can be an object recognition model. For instance, process 200 can determine a distance between a first object of interest of the obtained image and a second object of interest of the obtained image. Although image-based attributes may aid a machine learning model to generate robust event predictions, distances between objects of interest within an image provides the machine learning model with additional data to ensure the most accurate event predictions are generated.

For example, in the context of predicting whether a property is prone to a disaster, such as a fire, it is advantageous to know what the risk of having a fire may be. Various factors may be considered, such as the distance between the property and vegetation (e.g., as in the case of a forest fire, the closer vegetation is to the property, the more likely the property will experience a fire), the distance between the property and a fire department, the distance between a property and a body of water (e.g., as in the case of a fire to extinguish the fire, or a flood), the distance between the property and a road, the distance between the property and another structure associated with the property or other distances. As another example, the distances between objects of interest can be associated with features of the property itself. Distances between a first residence feature of a residence associated with the location of interest and a second residence feature of the residence associated with the location of interest may be advantageous to determine as such features/attributes may be useful when determining event predictions. For instance, a distance between a window and a chimney may impact whether the property is prone to a fire as a shorter distance between the two may cause a fire. As yet another example, a distance between a tree overhanging the property and the property itself may be an feature of interest, as the distance may be used to determine whether the property is prone to the tree falling on the house. As such, distances between objects of interest associated with the property provide additional information for the machine learning model to generate robust and accurate event predictions.

At 212, process 200 can cause a machine learning model to generate an event prediction, such as a risk event prediction. For example, process 200 can cause a third machine learning model to generate an event prediction by providing (i) the one or more image-based attributes, (ii) the distance (e.g., as obtained in 210), and (iii) a set of location attributes associated with the location of interest to the third machine learning model. The third machine learning model can be a neural network, deep learning model, convolutional neural network, recurrent neural network, support vector machine, or other machine learning model configured to generate event predictions. Event predictions can be associated with an environmental event, such as a fire, flood, storm, earthquake, tornado or other environmental event. Such event predictions may provide insight as to the severity, risk, or frequency at which the property of interest may be prone or impacted by a disaster. As an example, a severity can be a cost associated with a given environmental event occurring. For instance, a severity may be associated with a dollar amount indicating the cost associated with a flood at the location of interest. As another example, a frequency can be a number of times indicating how frequently a given environmental event may occur (e.g., in the future). For instance, a frequency event prediction may be the likelihood of how many times the location of interest may be impacted by a forest fire. As yet another example, the risk event prediction may be a risk score associated with the location of interest being impacted by a given environmental event. For instance, the risk event prediction can indicate a qualitative (e.g., high, medium, low) or quantitative value (e.g., decimal value, percentage, or other normalized value) that a given location of interest is at risk for a given environmental disaster. In this manner, the system provides a user with robust data indicating whether the location of interest may be prone to a disaster, thereby improving the user experience as such predictions may give insight as to which location of interest is appropriate to underwrite and which locations of interest are at high risk for a disaster.

In some implementations, a set of event predictions can be generated for the location of interest. For instance, to provide an abundance of data to an inspector or end-user regarding disasters that the location of interest may be prone to, a set of event predictions can be generated by the third machine learning model. For example, an event prediction regarding the risk of a fire, flood, and tornado may be generated by the third machine learning model. As another example, an event prediction regarding the severity, risk, and frequency of a storm can be generated by the third machine learning model. That is, for each category of an environmental event (e.g., a flood, fire, storm, tornado, earthquake), a risk, severity, or frequency value may be generated.

The location attributes may include relevant properties associated with the location of interest. For example, the location attributes may include one or more of policy information, weather event information, insurance claims information, insurance policy information, attributes of a property associated with the location. In some implementations, the location attributes can be current location attributes (e.g., current insurance policy information) or can be historical location attributes (e.g., historical weather event information).

Process 200 can access the local data store associated with the smart property analytics platform 108 (FIG. 1) to obtain the location attributes associated with the location. As an example, process 200 retrieves the location attributes associated with the location of interest by querying the local data store using the location identifier of the location of interest. The location attributes are advantageous to use when generating event predictions, as the third machine learning model can weigh historical policy information, weather event information, insurance claims information, and other location attributes of the property associated with the location of interest. For instance, the local data store can store a plethora of information that is associated with the location of interest. As discussed above, however, not only are the image-based attributes (e.g., of an image associated with the location of interest) and the distance(s) between objects of interest advantageous to use for determining an event prediction, but the location attributes may also shed light into whether the location of interest is prone to a disaster. For example, where a location of interest is subject to many historical insurance claims involving a fire, such information may affect an event prediction (e.g., where a large number of fire-related insurance claims may indicate that the location of interest may be more prone to a fire). As another example, where the location of interest is subject to many tornadoes, such information may affect an event prediction (e.g., where a large number of tornadoes may indicate that the location of interest may be more prone to storm damage). As such, by providing the set of location attributes associated with the location of interest to the third machine learning model to generate an event prediction, the machine learning model is enabled to generate more accurate and robust predictions by being provided with additional information.

In some implementations, process 200 can update one or more attributes associated with the location of interest. For example, process 200 can update one or more attributes based on an age of the attributes associated with the location of interest. For instance, as the local data store can store location attributes associated with the location of interest, to ensure that event predictions to be generated are based on the most up-to-date information, process 200 can verify that location attributes associated with the location of interest are up-to-date based on an image associated with the location of interest, such as the image obtained in 206.

For example, process 200 can compare one or more in the set of location attributes associated with the location of interest to the one or more image-based attributes to determine whether a first value associated with a first location attribute fails to match a second value associated with a corresponding image-based attribute. For instance, each location attribute associated with the location of interest can be associated with a value. For example, a location attribute of "amount of tree overhang" may be associated with a value of "10 feet" indicating that a tree (or a tree branch) may overhang a residence that is on the location of interest. However, an image-based attribute (e.g., as obtained in 208) may indicate that a corresponding image-based attribute of "amount of tree overhang" may be associated with a value of "5 feet." Process 200 can compare the respective values (e.g., 10 feet and 5 feet) and determine whether the values match. In response to process 200 determining that the values to not match, process 200 can identify a date-of-update associated with the location attribute and the corresponding image-based attribute. For example, further to each of the location attributes and the image-based attributes being associated with values, each location attribute and image-based attributes may further be associated with a date-of-update to indicate when the respective attribute was last updated.

Process 200 can identify such date-of-update values associated with the corresponding location attributes and image-based attributes to determine which one is newer than the other. For instance, continuing with the example above, the amount of tree overhang location attribute can be associated with a date-of-update of Jan. 19, 2023 and the corresponding image-based attribute can be associated with a date-of-update of Jan. 22, 2023. Process 200 can compare the date-of-update of the image-based attribute to the date-of-update of the location attribute and determine that the date-of-update associated with the location attribute is older than the date-of-update of the image-based attribute. In response to the date-of-update of the location attribute being older than the date-of-update of the image-based attribute, process 200 can update the value associated with the location attribute with the value associated with the image-based attribute. For example, the amount of tree overhang of the location attribute (e.g., as stored in the local data store) may be updated with the value of the image-based attribute. In this manner, the system ensures that the local data store stores the most up-to-date information to enable accurate generation of event predictions, thereby improving the user experience.

In some implementations, the one or more image-based attributes comprise one or more of environmental attribute information or attributes of a property associated with the location of interest.

In some implementations, prior to providing the attributes to the third machine learning model, process 200 can perform attribute pre-processing. For example, process 200 can perform attribute pre-processing to ensure that the input date to the third machine learning model is optimized to generate one or more event predictions. For instance, process 200 can generate missing values of the input data, can determine one or more outliers, can bin the image-based attributes, can generate attribute values corresponding to respective image-based attributes based on dates associated with the attribute values (e.g., as discussed above), or encode image-based attributes.

For example, process 200 can generate missing values by executing an iterative imputer-based operation. For instance, iterative imputers can estimate values for given attributes (e.g., location attributes, image based attributes, derived attributes, or other attributes associated with the location of interest) by generating missing values based on known values. For instance, where a location of interest is missing a "tree overhang" value, process 200 can use an iterative imputer to generate the missing value with respect to known values of tree overhang for other locations of interest. As another example, process 200 can determining one or more outliers of the one or more image-based attributes by executing an isolation forest-based operation. For instance, isolation forest-based operations can detect attribute anomalies with respect to the image-based attributes. That is, process 200 can use an isolation forest to determine whether a given image-based attribute of a location of interest does not conform to other values for a similar location of interest. For example, such isolation forest-based operation may better align the data, ensuring that an image-based attribute is not "wrong" and may skew an event prediction. Process 200 can bin the one or more image-based attributes by executing a k-bins discretizer-based operation. For example, process 200 can execute a k-bins discretizer-based operation on the one or more image-based attributes to reduce the amount of data. For instance, to increase event prediction efficiency, given the large amount of data being processed to generate such event predictions, process 200 can perform a k-bins discretizer-based operation to bin the image-based attributes associated with the location of interest. In this manner, by aggregating/reducing the amount of data provided to the machine learning model to generate an event prediction, the system reduces the amount of wasted computer processing and memory resources, thereby increasing the speed at which event predictions are generated.

In some implementations, process 200 can generate one or more attribute values corresponding to respective image-based attributes of the one or more image-based attributes by determining one or more dates associated with the set of location attributes associated with the location of interest. For example, process 200 can supplement the image-based attribute data with a set of corresponding location attributes associated with the location of interest. For example, process 200 can determine the dates at which the location attributes associated with the location of interest were last updated, and, if a corresponding location attribute is newer than a date associated with an image-based attribute, process 200 can update the image-based attribute data with the corresponding location attribute to ensure accurate event predictions are generated, thereby improving the user experience. Additionally, process 200 can perform an encoding of the one or more image-based attributes by executing a catboost encoder-based operation. For instance, encoding the one or more image-based attributes may transform alphanumerical data into numerical data. As alphanumerical data may be difficult to process via a machine learning model and also use a comparatively larger amount of computer processing and memory resources, encoding the one or more image-based attributes enables the system to reduce the amount of computer processing and memory resources required to generate accurate and robust event predictions.

In some implementations, process 200 can generate for display the information associated with the event prediction. For example, process 200 can generate for display, at a GUI, information associated with the event prediction. The information can be presented using a visualizer component.

The information associated with the event prediction can be a severity, risk, or frequency at which the property of interest may be prone or impacted by a disaster. For instance, as discussed above, where the event prediction is a severity event prediction, process 200 can generate for display at a GUI, a predicted cost associated with a given environmental event. As another example, where the event prediction is a frequency event prediction, process 200 can generate for display at a GUI, a predicted risk score associated with a given environmental event (e.g., the risk to which the location of interest may be impacted by a flood, fire, tornado, storm). As yet another example, where the event prediction is a frequency event prediction, process 200 may generate for display at a GUI, a predicted frequency indicating a number of times at which the location of interest may be impacted by a given environmental event. In some implementations, the information associated with the event prediction can include one or more visual indicators. For example, the one or more visual indicators may be a graphical representation of data associated with the event prediction. For instance, the visual indicators may be a distribution of insurance claims associated with a geographic region of the location of interest for a given environmental event, such as a distribution of a number of insurance policies covering an environmental event over a geographic area, a distribution of a number of insurance claims covering an environmental event over a geographic area, a distribution of severity (e.g., average building incurred amount) with respect to an environmental event over a geographic area, a graph indicating location attributes with respect to a number of insurance claims and the condition of the location attributes, a graph indicating location attributes with respect to a severity of an environmental event, images associated with the location of interest, attributes associated with the location of interest, insurance claim details associated with the location of interest, insurance policy details associated with the location of interest, or other information.

In some implementations, process 200 can generate a second event prediction. For example, as discussed above, to reduce network traffic associated with generating insurance-related event predictions, process 200 can generate event predictions using an image obtained from the local data store. That is, as opposed to querying for an image associated with the location of interest from a remote data store, process 200 can extract image-based attributes from an image associated with the location of interest from the local data store, similar to that obtained in 208. For example, in response to the at least one image of the set of images (e.g., obtained from the local data store) satisfying the data recency criterion, process 200 can extract one or more image-based attributes from the at least one image of the set of images associated with the location of interest from the local data store. Process 200 can determine a distance between a first object (e.g., an object of interest) of the at least one image of the set of images and a second object (e.g., a second object of interest) of the at least one image of the set of images. Process 200 can cause the machine learning model to generate a second event prediction, by providing (i) the one or more second image-based attributes, (ii) the second distance, and (iii) the set of location attributes associated with the location of interest to the machine learning model. For example, the event prediction can be associated with a second category of environmental events, and process 200 can generate and display, at the GUI, one or more second visual indicators associated with the second event prediction. For instance, similar to 208-210, process 200 can generate for display information associated with the second event prediction using extracted image-based attributes from an image associated with the location of interest obtained from the local data store. In this manner, the system reduces the number of queries and other requests over a network to obtain up-to-date information when generating event predictions, thereby reducing the amount of network traffic and improving the user experience.

In some implementations, process 200 can generate an event prediction based on weather-based attributes. For instance, using weather data associated with the location of interest may be advantageous increase predictive value of machine learning models. As such, process 200 can retrieve, from a communicatively coupled data store, weather data associated with the location of interest by querying the communicatively coupled data store. The communicatively coupled data store may be a remote data store associated with the smart property analytics platform 108 (FIG. 1). For example, the communicatively coupled data store may be a remote data store such as Climate Data Online® (CDO) or other remote data store storing historical weather information.

Process 200 can query the communicatively coupled data store using a location identifier associated with the location of interest to obtain current/historical weather data associated with the location of interest. Process 200 can extract, from the weather data, a set of weather events satisfying a weather event recency criterion. For instance, process 200 can extract a set of weather events that correspond to a predetermined weather event recency criterion. The weather event recency criterion can be a predetermined date range, timestamp range, or other data recency criterion. For example, although the communicatively coupled data store may store weather event data associated with the location of interest over the past 50 years, some of the data (e.g., the oldest data) may not correspond to the current climate of the location of interest and may skew event prediction accuracy. As such, process 200 can extract a set of weather events from the weather data that satisfy the weather event recency criterion. For example, the weather event recency criterion may indicate to extract weather event data associated with the location of interest over the past 2 years. Process 200 can parse through the weather data associated with the location of interest and compare a weather event recency value indicating the age of a given weather event of the weather data to the weather event recency criterion, and determine whether the weather event recency value for a given weather event satisfies (e.g., is within or at) the weather event recency criterion.

Process 200 can determine, from the set of weather events, a subset of severe weather events each satisfying a weather event severity criterion. For instance, when generating event predictions, the severity of a given weather event associated with the location of interest may be advantageous to use. When an inspector or insurance adjuster is attempting to determine what coverages a property associated with a location of interest should have, knowing the severity of weather events may shed light onto which insurance policy coverages are deemed useful to the insurance applicant to protect the insurance applicant from large bills from an uncovered event. As such, process 200 can determine a subset of severe weather events from the set of weather events.

Such subset of weather events can satisfy a weather event severity criterion. The weather event severity criterion can be a predetermined threshold value of severity. For example, the weather event severity criterion may be an industry standard such as a category of a hurricane, severe weather event definitions published by weather.gov (e.g., criteria for a severe thunderstorm), severe weather statements (e.g., flash flood, flash flood warning, flash flood watch, tornado, tornado warning, tornado watch, fire, fire watch, fire warning), or other weather event severity criteria/criterion. Each weather event of the set of weather events can be associated with a severity value (e.g., a numeric, alphanumeric, text, or other value). For example, each severity value may be an industry standard associated with the given weather event, as described above. Process 200 can compare each severity value of the set of weather events to the weather event severity criterion, and when a severity value satisfies the weather event severity criterion, process 200 can select a respective weather event as part of the subset of severe weather events. The severity value of a respective weather event may satisfy the weather event severity criterion when the severity value meets or exceeds the severe weather event criterion. For example, on a qualitative basis, if a weather event is associated with a severity value of "flash flood warning" and the weather event severity criterion is a "flash flood watch," the weather event severity criterion may be satisfied. As another example, on a quantitative basis, if a weather event is associated with a severity value of "category 3 hurricane" and the weather event severity criterion is a "category 3 hurricane," the weather event severity criterion may be satisfied.

Process 200 can extract, from the subset of severe weather events, one or more weather-based attributes. For example, the weather based-attributes may be a severity of the weather event, the time/date of the weather event, the type of weather event (e.g., storm, hurricane, fire, vegetation fire, flood, tornado), wind speed, barometric pressure, temperature, amount of precipitation, ice conditions, or other weather-based attributes. For example, process 200 can perform NLP on weather information associated with each of the subset of sever weather events to extract such weather-based attributes. Process 200 can provide the extracted weather-based attributes to the third machine learning model to generate the event prediction. For example, process 200 can provide the third machine learning model (i) the one or more image-based attributes, (ii) the distance, (iii) the set of location attributes, and (iv) one or more weather-based attributes to the third machine learning model to generate an event prediction. In this manner, the system generates more robust and accurate predictions by including severe weather information associated with the location of interest, thereby improving the user experience as inspectors and end-users alike are provided with accurate event prediction information further based on severe weather information.

Generating Comparative Data for Event Predictions

Figure 2B:
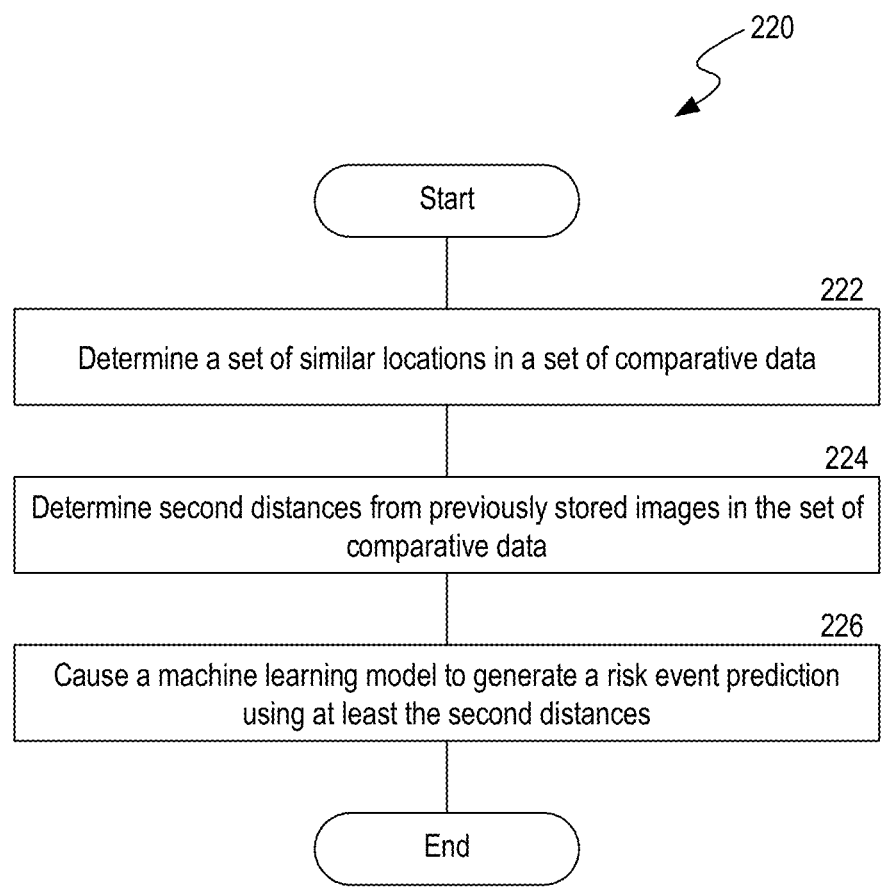

FIG. 2B is a flowchart showing a process for reducing network traffic associated with generating insurance-related event predictions based on cognitive image analysis, in accordance with some implementations of the present technology. In an example implementation, process 220 can be performed by the smart property analytics platform 108 shown in FIG. 1. However, one of skill will appreciate that process 220 can be performed, in whole or in part, on another suitable computing device, such as the external system 102 and/or the client device 104. Furthermore, the features of various machine learning models described herein can be omitted and/or combined to reduce the number of machine learning models.

In some implementations, to generate accurate insurance-related event predictions, comparative location of interest data can be determined. For instance, to provide an inspector, insurance adjuster, or end-user with robust event predictions indicating information regarding a location of interest, providing a machine learning model with additional information regarding similar locations of interest, respective image-based attributes, respective location-based attributes, and distances between objects of interest enables the machine learning model to learn one or more relationships between data associated with similar locations and a given location of interest. For example, a property of one location may have similar attributes with respect to the location of interest. Using data of the similar locations may aid the machine learning model when generating event predictions as the machine learning model may use historical insurance policy, insurance claim data, image data, and distances between objects of interest of the similar locations to generate accurate event predictions. Advantageously, the process 220 automatically determines relevant locations of interest to improve the quality of predictions made by machine learning models. The automatic determination process provides a technical advantage of enabling a greater degree of accuracy when a machine learning model is trained.

At 222, process 220 can determine a set of similar locations in a set of comparative data. For example, process 220 can determine a set of similar locations to a location of interest by comparing one or more attributes in the set of location attributes associated with the location of interest to one or more of a set of location attributes associated with a different set of location. The set of location attributes associated with the different set of locations can be obtained via the local data store associated with the smart property analytics platform 108 (FIG. 1). Process 220 can query the local data store to obtain the set of locations, and can determine a set of similar locations to the location of interest by comparing the set of location attributes associated with the location of interest to a set of location attributes associated with the set of locations obtained via the local data store. For example, process 220 can compute Euclidean distances between each corresponding attribute associated with the set of locations obtained via the local data store and each corresponding attribute associated with the location of interest. For example, a corresponding attribute may be an attribute that is the same or similar to another attribute. As another example, a corresponding attribute may be an attribute that is of the same type as another attribute. For instance, an attribute may correspond to another attribute where a respective label is the same as the other attribute (e.g., location identifier, number of windows, state, country, address, number of rooms, number of doors). That is, although a value associated with a given attribute may be different between a location of interest and another location, the attributes may correspond to one another where they are of the same type. For instance, where the location of interest has an attribute labeled "num_windows=5" and another location has an attribute labeled "num_windows=10," although the value (e.g., 5, 10) are not the same, the labels ("num_windows") are the same, thus, indicating corresponding attributes. Process 220 can average each of the Euclidean distances to determine an overall similarity score. For example, for each corresponding attribute, process 220 can average the Euclidean distances determined based on the corresponding attribute's values and provide an overall similarity score.

In some implementations, process 220 can select, using the averaged Euclidean distances, each location of the set of locations obtained via the local data store that satisfies an average threshold condition to generate the set of similar locations. For example, the average threshold condition can be a predetermined threshold condition, where such average threshold condition is satisfied where the average Euclidean distance of one location meets or exceeds the average threshold condition. For instance, where a first location of the set of locations obtained via the local data store has an average Euclidean distance amongst the location attributes associated with the first location of 0.8 and the average threshold condition is 0.75, the first location satisfies the average threshold condition and can be selected as a similar location.

At 224, process 220 can determine second distances from previously stored images in the set of comparative data. For instance, process 220 can, for each similar location of the set of similar locations, by the second machine learning model, a second distance between (i) a first object of the respective similar location and (ii) a second object of the respective similar location, of at least one image associated with the respective similar location. For example, similar to 208, process 220 can determine second distances between objects of interest in an image associated with a respective similar location. Each similar location of the set of similar locations can each be associated with one or more images. Such images may be aerial imagery indicating one or more objects that are presented in the imagery, such as a residence associated with the location of interest, a body of water, vegetation, trees, roads, etc. For instance, by determining distances between objects present in the imagery of the set of similar locations, the system enables more robust and accurate event predictions to be generated, thereby improving the user experience.

At 226, process 220 can cause a machine learning model to generate a risk event prediction using at least the second distances. For example, process 220 can cause the third machine learning model to generate a risk event prediction using the distances determined in 224. For instance, as the distances between objects of interest of the similar locations may shed light onto whether a location of interest is prone to a disaster, process 220 can provide the third machine learning model with the second distances (e.g., the distances between objects of interest of the set of similar locations) to generate a risk event prediction. For example, similar to 212, in some implementations, where the event prediction is a risk event prediction, process 220 can cause the third machine learning model to generate the risk event prediction, by providing to the third machine learning model (i) the one or more image-based attributes (e.g., of the location of interest), (ii) the distance (e.g., of the location of interest), (iii) the set of location attributes associated with the location of interest, and (iv) the second distance for each similar location of the set of similar locations. For instance, the risk event prediction may indicate a level of risk of an first environmental event associated with the location of interest with respect to each similar location of the set of similar locations. That is, by using the distance(s) between objects of interest of the similar set of locations, the third machine learning model generates more accurate risk event predictions with respect to a given environmental event. For example, the risk event prediction may be a risk score (e.g., a decimal value, an integer, a percentage, a ratio representing a probability of an event) indicating a level of risk for the location of interest having a fire, flood, tornado, storm damage, or other environmentally-related event.

In some implementations, process 220 can generate a severity event prediction. For example, a severity event prediction may indicate a cost associated with a given environmental event. To enable an inspector, insurance adjuster, or end-user to determine how much damage a given environmental event may cause, the severity event prediction may leverage historical insurance claim data from the set of similar locations to generate an accurate prediction as to how much damage an environmental event may affect the location of interest. As such, process 220 can determining, for each similar location of the set of similar locations, one or more insurance claims, wherein each insurance claim is associated with an environmental event. For example, the local data store can store historical insurance claim data indicating claim attributes such as the time/date an insurance claim was made, damages associated with the respective location (e.g., roof damage, siding damage, interior/exterior damage), the type of environmental event (e.g., flood, fire, storm), an amount of repairs (e.g., cost of repairs for the damages), or other insurance claim-related data. Process 220 can extract, from the one or more insurance claims, one or more claim attributes. Process 200 can cause the third machine learning model to generate the severity event prediction by providing to the third machine learning model (i) the one or more image-based attributes (e.g., of the location of interest), (ii) the distance (e.g., of the location of interest), (iii) the set of location attributes associated with the location of interest, (iv) the second distance for each similar location of the set of similar locations, and (v) the one or more claim attributes of the similar locations. The severity event prediction may indicate a predicted cost associated with a first environmental event associated with the location of interest with respect to each similar location of the set of similar locations. For example, the severity event prediction may indicate a dollar amount of costs associated with a flood, fire, storm, tornado, earthquake, or other environmental event with respect to the set of similar locations. In this manner, the system generates robust and accurate event predictions by leveraging insurance claims data associated with similar locations.

Machine Learning Model(s)

Figure 3:
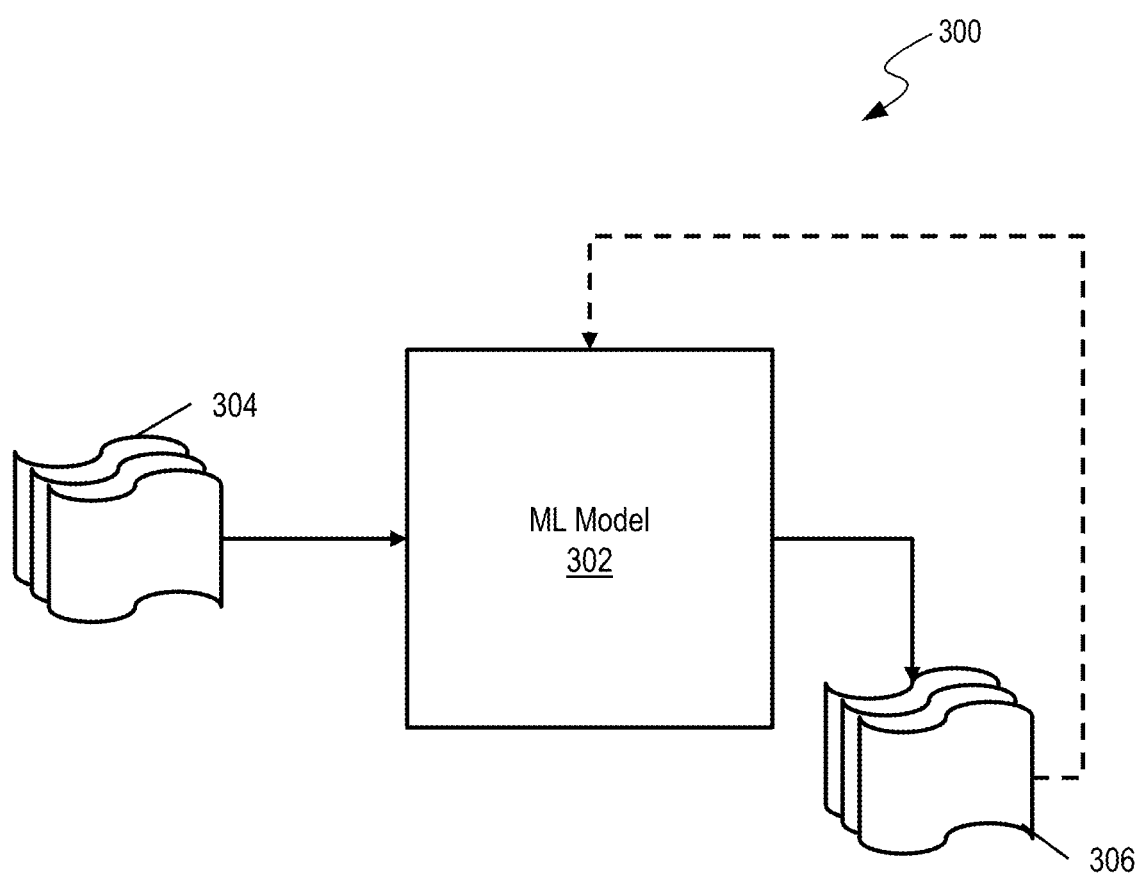
FIG. 3 is an illustrative diagram illustrating a machine learning model of the smart property analytics platform, in accordance with some implementations of the present technology.

FIG. 3 is an illustrative diagram illustrating a machine learning model of the smart property analytics platform, in accordance with some implementations of the present technology. In some implementations, machine learning model 302 can be part of, or work in conjunction with analytics engine 120 (FIG. 1) or attributes acquisition engine 110 (FIG. 1).

In some implementations, the machine learning model 302 can include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some embodiments, neural networks can include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

As an example, with respect to FIG. 3, machine learning model 302 can ingest inputs 304 and provide outputs 306. In one use case, outputs 306 can be fed back to machine learning model 302 as input to train machine learning model 302 (e.g., alone or in conjunction with user indications of the accuracy of outputs 306, labels associated with the inputs, or with other reference feedback information). In another use case, machine learning model 302 can update its configurations (e.g., weights, biases, or other parameters) based on its assessment of its prediction (e.g., outputs 306) and reference feedback information (e.g., user indication of accuracy, reference labels, or other information). In another use case, where machine learning model 302 is a neural network, connection weights can be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this manner, for example, the machine learning model 302 may be trained to generate better predictions.

As an example, where the prediction models include a neural network, the neural network can include one or more input layers, hidden layers, and output layers. The input and output layers can respectively include one or more nodes, and the hidden layers may each include a plurality of nodes. When an overall neural network includes multiple portions trained for different objectives, there may or may not be input layers or output layers between the different portions. The neural network can also include different input layers to receive various input data. Also, in differing examples, data can input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some implementations, machine learning model 302 can be trained based on information stored in a local data store associated with the smart property analytics platform 108 (FIG. 1) or a remote data store associated with the smart property analytics platform 108 (FIG. 1) to generate predictions related to mapping platform identifiers to one or more computing aspects. For example, the local data store associated with the smart property analytics platform 108 (FIG. 1) can include information regarding a set of locations. For example, the information for each location of the set of locations may include a location identifier, a set of images associated with the respective location, and a set of location attributes associated with the respective location. The set of images associated with the respective location can include aerial imagery, ground imagery, street view imagery, interior imagery (e.g., interior imagery of a residence associated with the respective location), or other imagery associated with the respective location. Each image of the set of images can further be associated with a timestamp/date indicating a time/date at which the image was captured. Additionally, each image of the set of images can further be associated with determined distances between objects of interest within the respective images. For example, similar to a process described in 210 (FIG. 2A), distances between objects of interest within the respective images may be determined and labeled with respect to the image. Moreover, similar to a process described in 208 (FIG. 2A), image-based attributes can be extracted from the respective image and labeled with respect to the image. The set of location attributes associated with the respective location can include insurance policy information, insurance claims information, historical weather events information, or property attribute information. For example, the insurance policy information may include information such as the name of an applicant, a date at which the policy was executed, insurance coverage information, deductible amount, coverage amounts, or other insurance policy information. The insurance claims information can include information such as the date of an insurance claim, a reason as to why the insurance claim was executed, an environmental event associated with the claim, repair information (e.g., cost of repairs, attributes of a residence that were damaged), or other insurance claims information.

As an example, in some implementations, where machine learning model 302 is a cognitive image analysis model, machine learning model 302 can be configured to extract one or more image-based attributes from an image. For instance, machine learning model 302 can ingest a first set of training information as input 304. The first set of information can include one or more labeled images of respective training locations of interest. For instance, the labels of the labeled images may indicate one or more image-based attributes of a respective image. Such attributes may identify attributes of a residence or property associated with the training locations of interest to enable machine learning model 302 to be trained. For example, the attributes may indicate material types (e.g., vinyl, asphalt, clay, brick, wood) of a residence associated with a training location, a number of features (e.g., windows, doors, chimneys, locks) of a residence associated with a training location, geographic features of the property associated with a training location (e.g., a body of water, a road, vegetation, hills, mountains, trees), or other image-based attributes. Machine learning model 302 can ingest the first set of information as input 304 and generate image-based attributes as output 306. In some embodiments, output 306 may be fed back into machine learning model 302 to update one or more configurations (e.g., weights, biases, or other parameters) based on its assessment of its prediction (e.g., outputs 306) and reference feedback information (e.g., user indication of accuracy, reference labels, ground truth information, known image-based attribute labels, or other information).

As another example, in some implementations, where machine learning model 302 is an object recognition model, machine learning model 302 can be configured to extract one or more image-based attributes from an image. For instance, machine learning model 302 can ingest a second set of training information as input 304. The second set of information can include one or more labeled images of respective training locations of interest. For instance, the labels of the labeled images may indicate one or more object-based attributes of a respective image. Such attributes may identify attributes of a residence or property associated with the training locations of interest to enable machine learning model 302 to be trained. For example, the attributes may indicate objects within the image, such as geographic features of the property associated with a training location (e.g., a body of water, a road, vegetation, hills, mountains, trees), a residence location, or other object-related attributes. Additionally, object-based attributes may also include determined distances between objects within the respective images. For example, similar to the distance determined in 210, the distances between the objects within the respective images may be labeled. Machine learning model 302 can ingest the second set of information as input 304 and generate object-based attributes as output 306. For example, the object-based attributes may include a distance between a first object of interest of an image and a second object of interest of the image. In some embodiments, output 306 may be fed back into machine learning model 302 to update one or more configurations (e.g., weights, biases, or other parameters) based on its assessment of its prediction (e.g., outputs 306) and reference feedback information (e.g., user indication of accuracy, reference labels, ground truth information, known object-based attribute labels, or other information).

As yet another example, in some implementations, where machine learning model 302 is an third machine learning model, machine learning model 302 can be configured to generate event prediction(s). For instance, machine learning model 302 can ingest a third set of training information as input 304. The third set of information can include (i) one or more image-based attributes of a training location, (ii) distance(s) between object(s) of interest within an image associated with the training location, (iii) and a set of location attributes associated with the training location. Machine learning model 302 can ingest the third set of training information as input 304 and generate event predictions as output 306. For example, the event predictions may be associated with a category of environmental events (e.g., fire, flood, storm, earthquake). Additionally, in some implementations, the event predictions may be associated with a risk, frequency, or severity associated with a respective environmental event. In some embodiments, output 306 may be fed back into machine learning model 302 to update one or more configurations (e.g., weights, biases, or other parameters) based on its assessment of its prediction (e.g., outputs 306) and reference feedback information (e.g., user indication of accuracy, reference labels, ground truth information, known event predictions, or other information).

Visual Indicators Associated with Event Predictions

FIGS. 4A-4D show example visual indicators of information associated with event predictions, in accordance with some implementations of the present technology.

As discussed above, in some implementations, the smart property analytics platform can generate one or more visual indicators associated with an event prediction. Such visual indicators enable inspectors, surveyors, insurance adjusters, underwriters and other stakeholders to be provided with a plethora of information regarding whether a location of interest may be prone to a disaster/environmental event, whether a geographic area associated with the location of interest is prone to a disaster/environmental event, severity of a disaster/environmental event, risk of a disaster/environmental event, or other information associated with a location of interest.

Figure 4A:
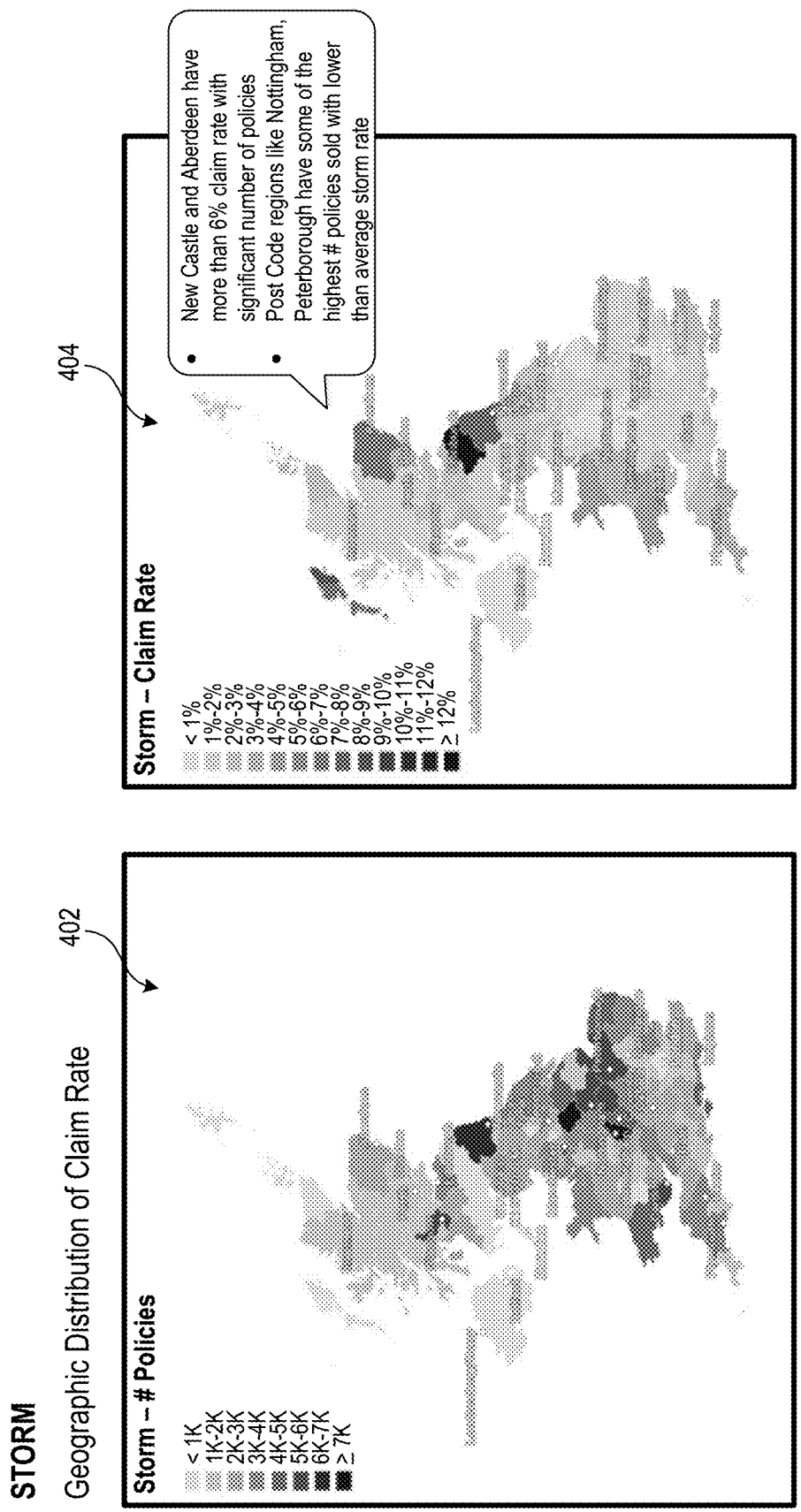
FIGS. 4A-4D show example visual indicators of information associated with event predictions, in accordance with some implementations of the present technology.
Figure 4A:
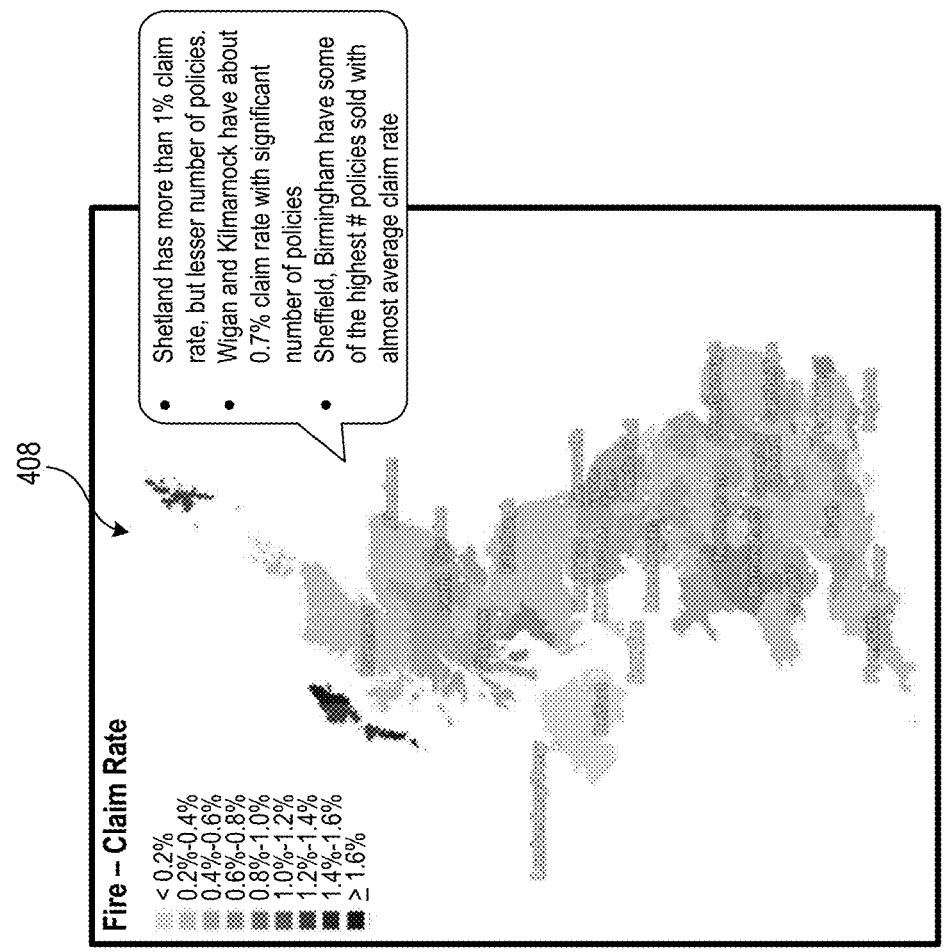
Figure 4A:
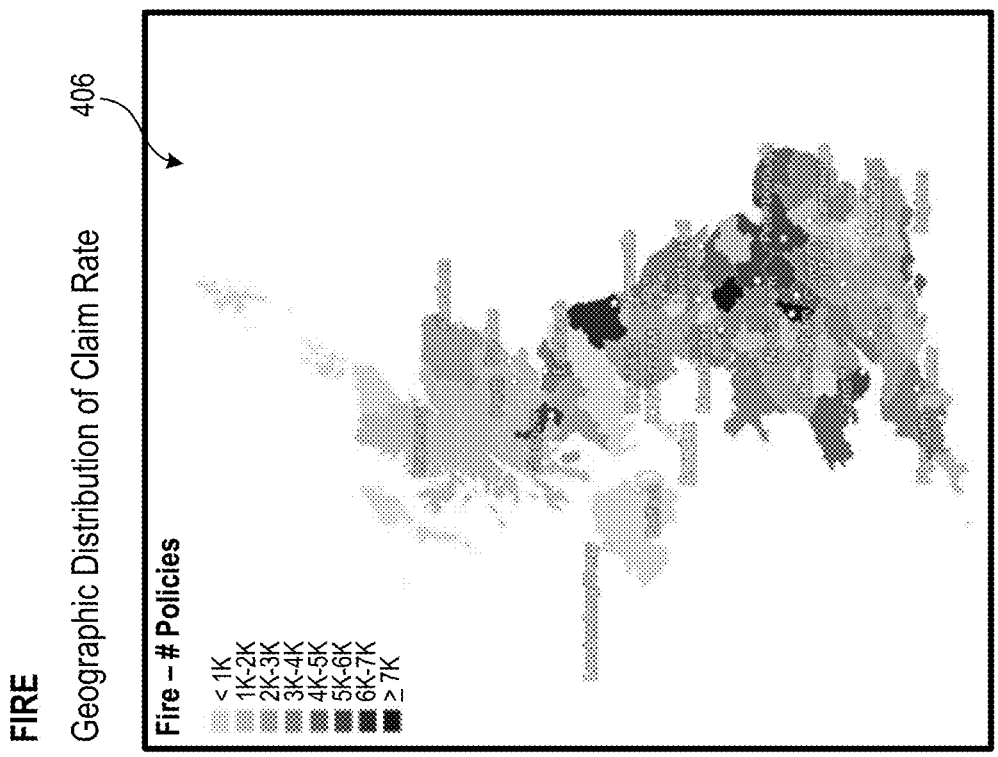

For example, referring to FIG. 4A, in some implementations, a visual indicator associated with an event prediction can be a geographic distribution of an environmental event associated with a location of interest with respect to insurance policy and claims information. For instance, first visual indicator 402 can indicate a number of insurance policies per geographic region that may be associated with a location of interest. In particular, first visual indicator 402 shows a geographic, color-coded, distribution of how many insurance policies related to a storm are in place for different counties. In some implementations, process 200 (FIG. 2A) can generate such a visual indicator for a location of interest, where the location of interest is within the geographic region of the first visual indicator 402. Second visual indicator 404 can indicate a number of insurance claims per geographic region that may be associated with a location of interest. In particular, second visual indicator 404 shows a geographic, color-coded, distribution of how many insurance claims related to the storm have been executed for differing counties. In some implementations, process 200 (FIG. 2A) can generate such a visual indicator for location of interest, where the location of interest is within the geographic region of the second visual indicator 404. As another example, third visual indicator 406 can be similar to first visual indicator 402, albeit with respect to a fire (e.g., environmental event), and fourth visual indicator 408 may be similar to second visual indicator 404, albeit with respect to a fire (e.g., environmental event).

Figure 4B:
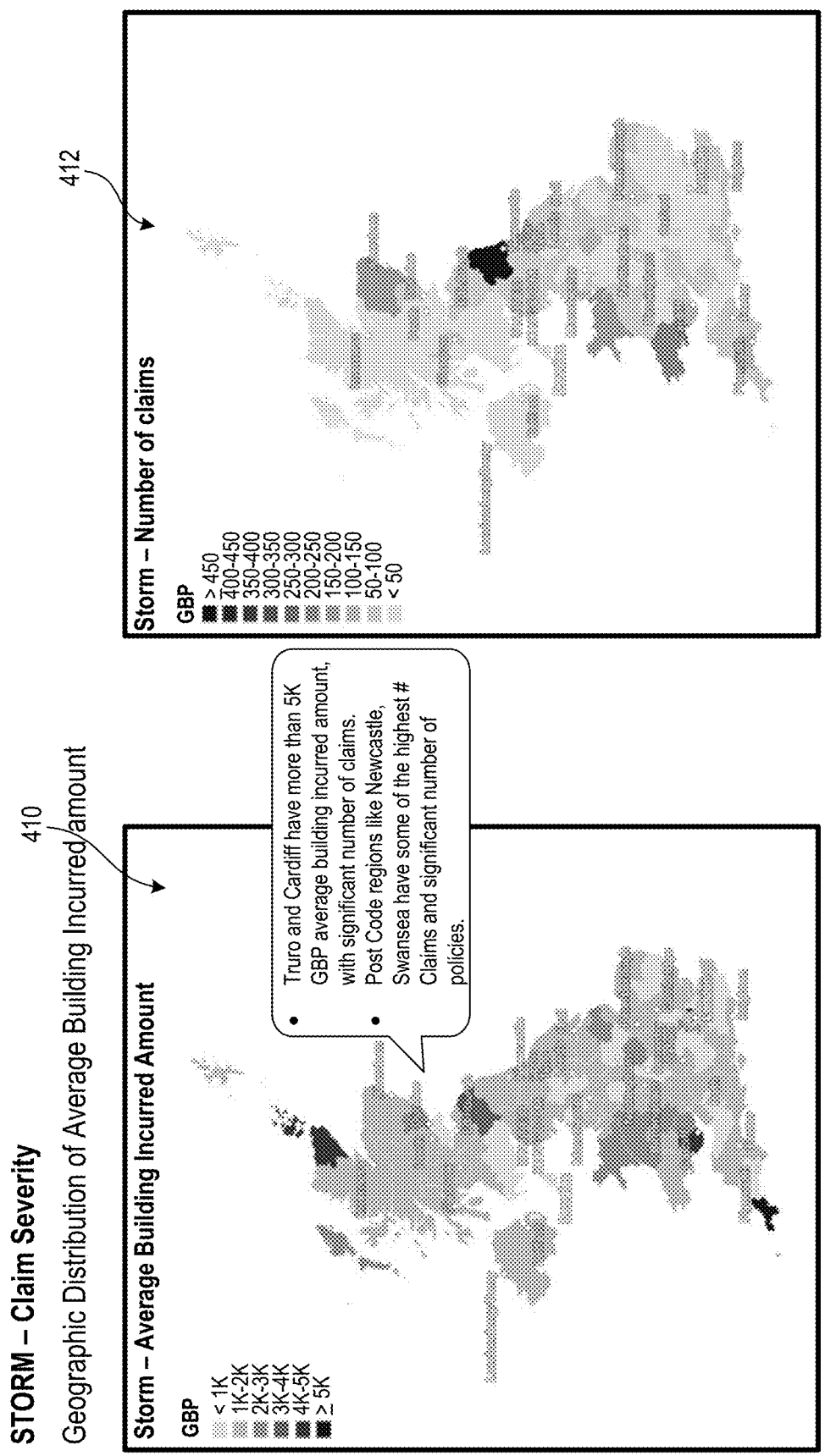
Figure 4B:
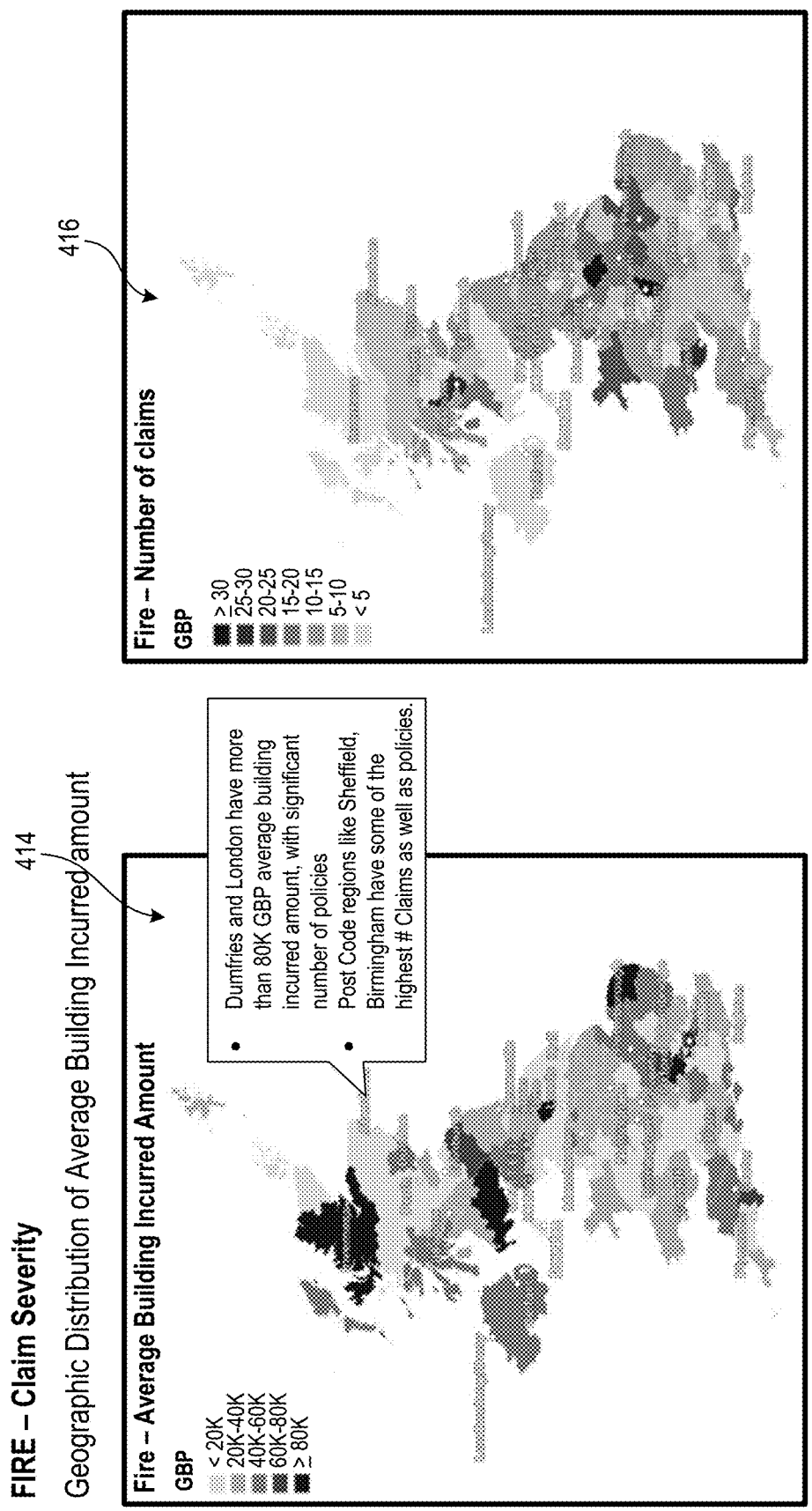

Referring to FIG. 4B, in some implementations, a visual indicator associated with an event prediction can be a geographic distribution of an environmental event associated with a location of interest with respect to a severity. For example, fifth visual indicator 410 can indicate a level of severity of an environmental event per geographic region that may be associated with a location of interest. In particular, fifth visual indicator 410 shows a geographic, color-coded, distribution of storm severity (e.g., costs) for differing counties. In some implementations, process 200 (FIG. 2A) can generate such a visual indicator for a location of interest, where the location of interest is within the geographic region of the fifth visual indicator 410. Sixth visual indicator 412 can indicate a number of claims executed per geographic region with respect to an environmental event. In particular, sixth visual indicator 412 may indicate a number of insurance claims executed with respect to a storm for differing counties. In some implementations, process 200 (FIG. 2A) can generate such a visual indicator for a location of interest, where the location of interest is within the geographic region of the sixth visual indicator 412. Seventh visual indicator 414 can be similar to fifth visual indicator 410, albeit with respect to a fire, and eighth visual indicator 416 may be similar to sixth visual indicator 412, albeit with respect to a fire.

Figure 4C:
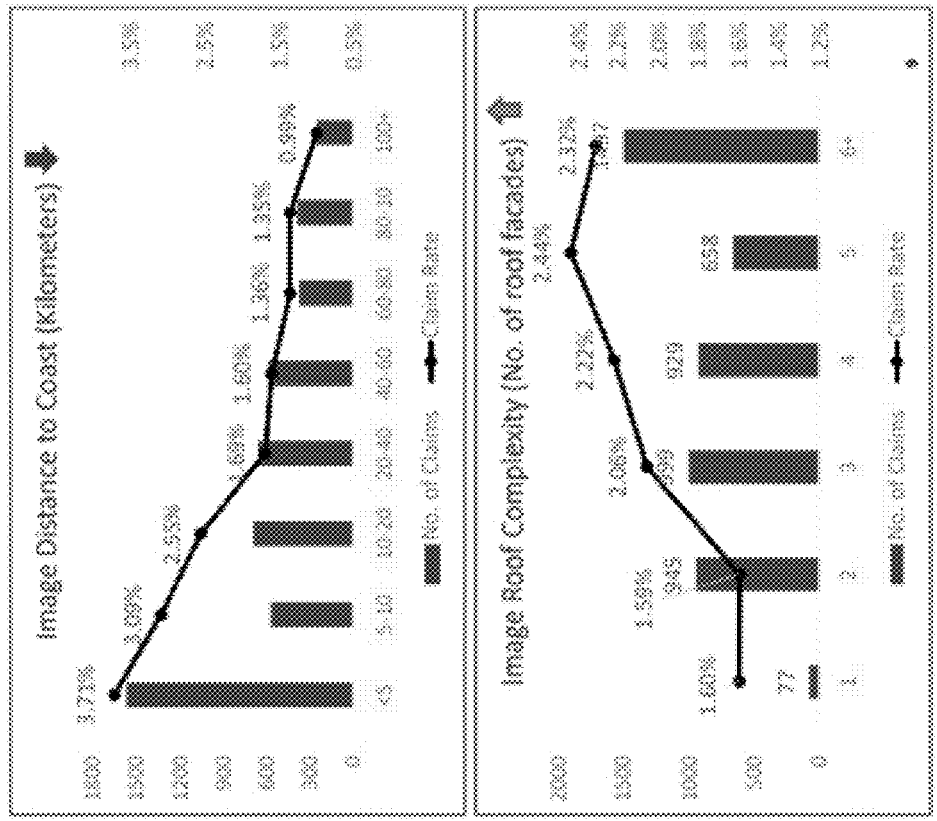
Figure 4C:
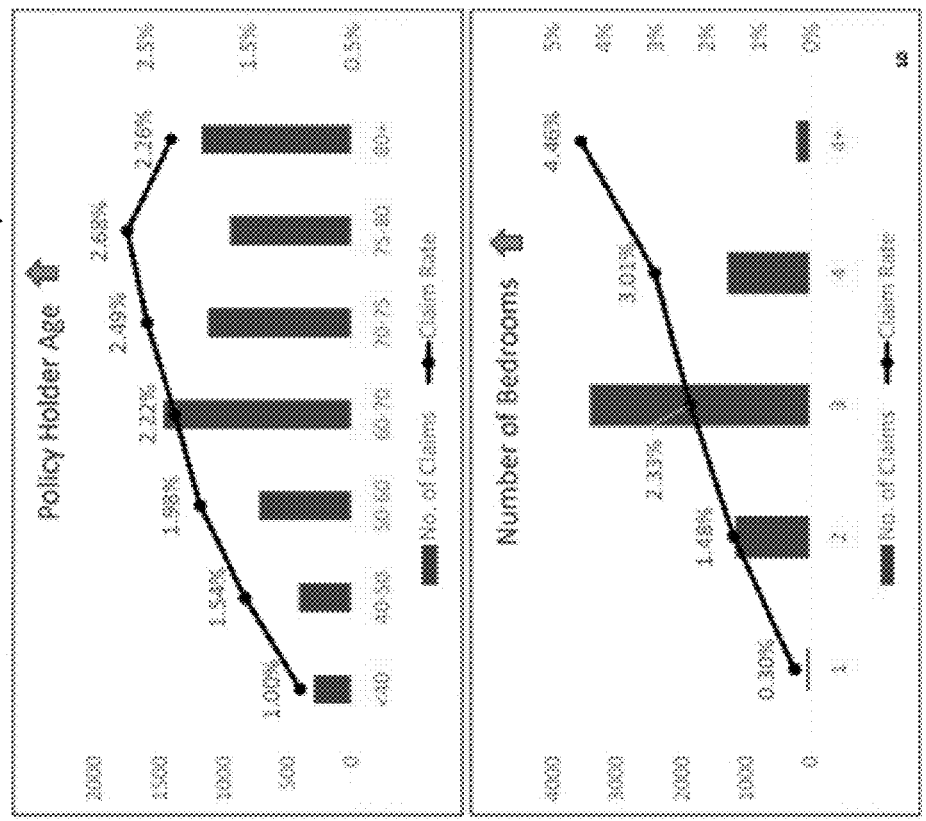
Figure 4C:
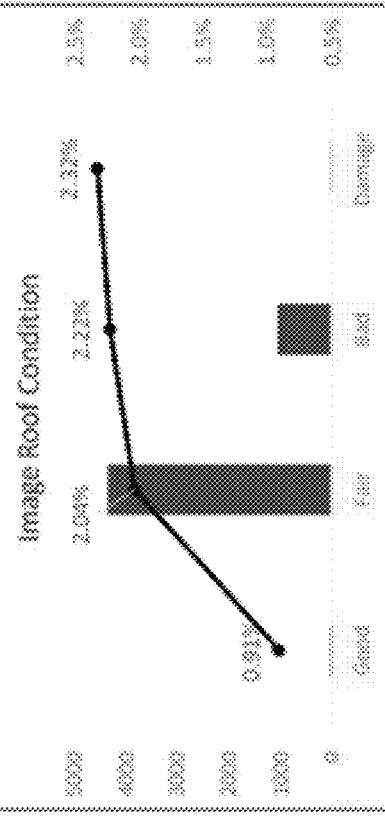
Figure 4C:
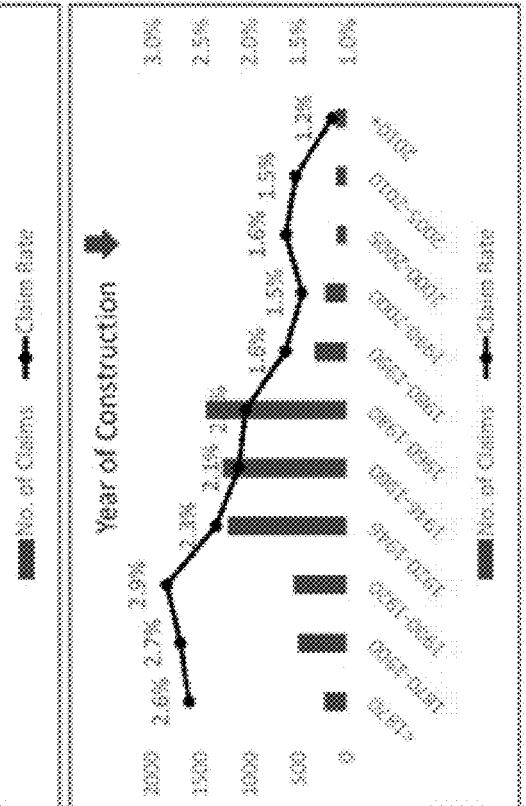
Figure 4C:
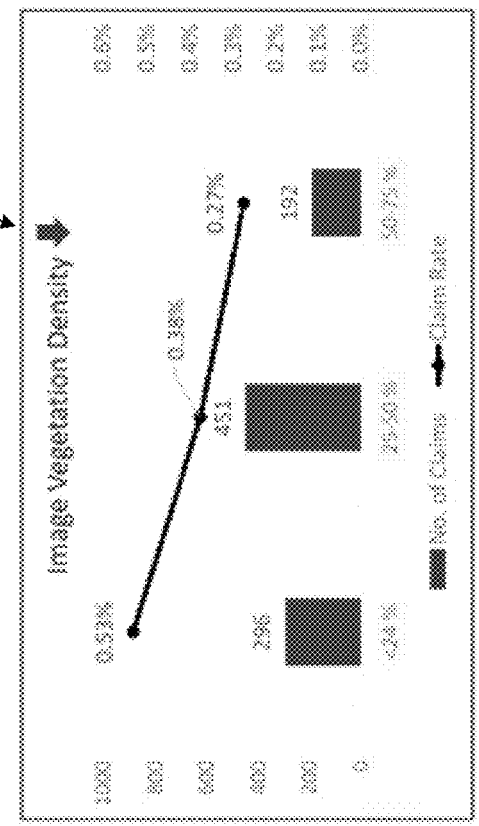
Figure 4C:
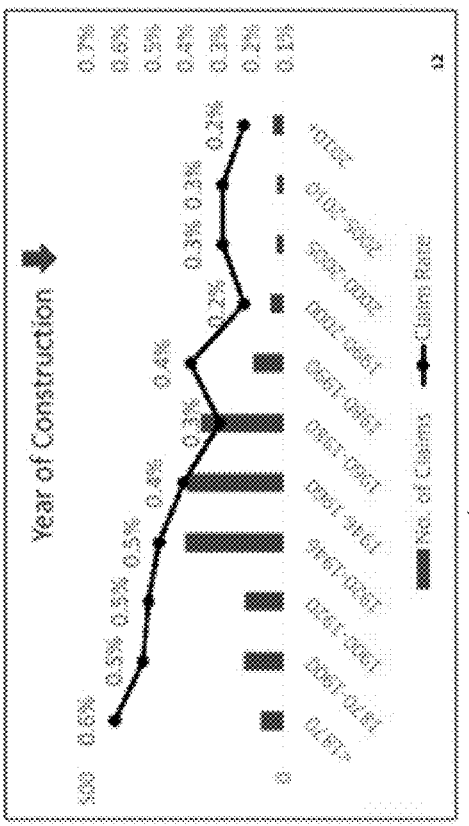
Figure 4C:
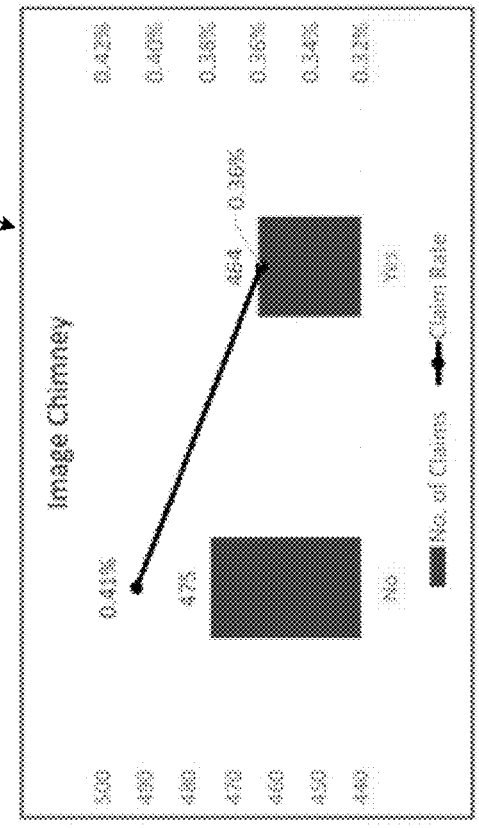
Figure 4C:
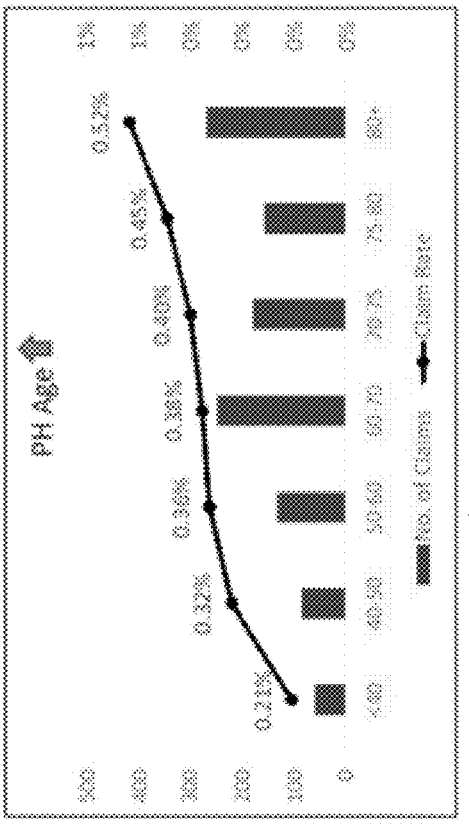

Referring to FIG. 4C, in some implementations, a visual indicator associated with an event prediction can be a graph indicating a number of insurance claims, an insurance claim rate, and a given attribute of a location of interest. For example, providing graphical data of a given attribute of a location of interest as compared to other attributes of different locations of interest, an inspector, surveyor, or insurance adjuster may be able to pinpoint which attributes of a location of interest should be focused on with respect to a given environmental event. For example, such attributes may be location-based attributes, image-based attributes, or other attributes, such as derived attributes.

Figure 4D:
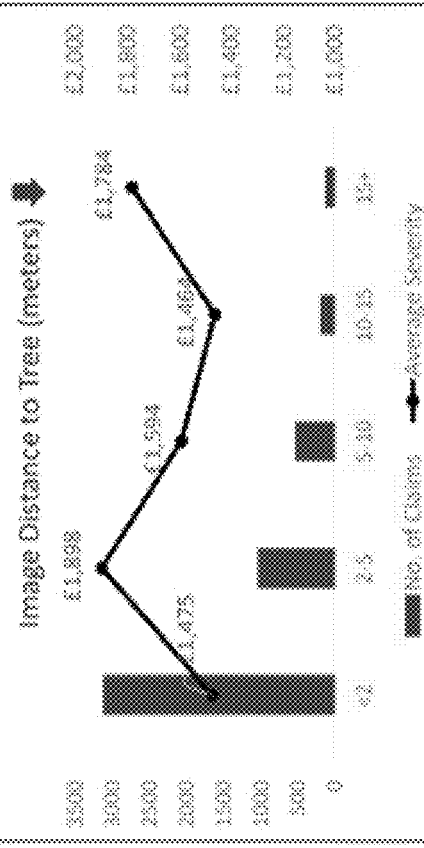
Figure 4D:
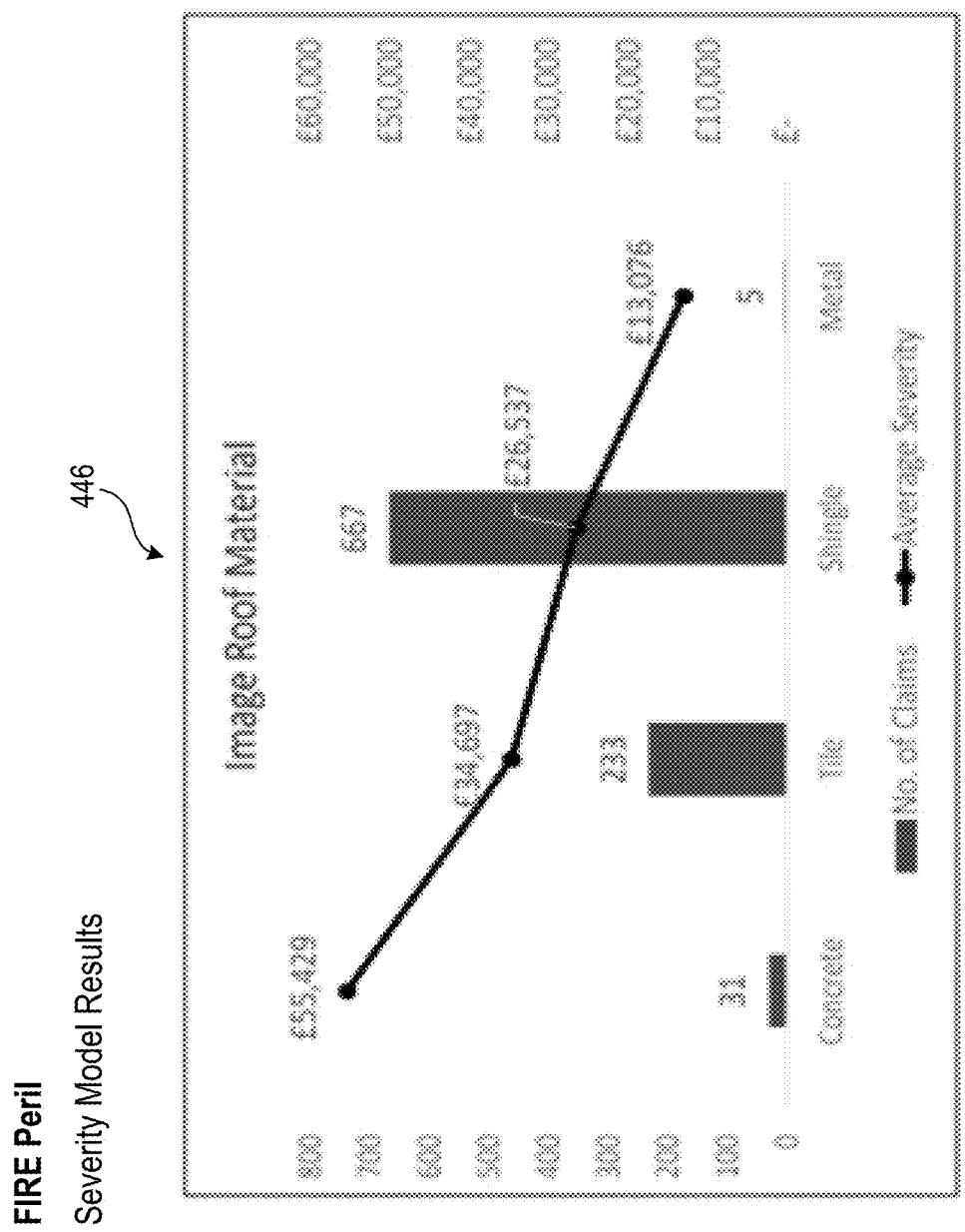

For instance, ninth visual indicator 418 can be a bar graph indicating footprint size of locations of interest relative to a number of claims with respect to a storm. Tenth visual indicator 420 can be a bar graph indicating the size of fiberglass relative to a number of claims with respect to a storm. Eleventh visual indicator 422 can be a bar graph indicating a distance to a coastline relative to a number of claims with respect to a storm. Twelfth visual indicator 424 can be a bar graph indicating the roof complexity (e.g., number of roof facades) relative to a number claims with respect to a storm. Thirteenth visual indicator 426 can be a bar graph indicating the roof condition relative to a number of claims with respect to a storm. Fourteenth visual indicator 428 can indicate a number of years of construction relative to a number claims with respect to a storm. Fifteenth visual indicator 430 can indicate a policyholder age relative to a number claims with respect to a storm. Sixteenth visual indicator 432 can indicate a number of bedrooms relative to a number claims with respect to a storm. Seventeenth visual indicator 434 can indicate a number of chimneys relative to a number of claims with respect to a fire. Eighteenth visual indicator 436 can indicate a policyholder's age relative to a number claims with respect to a fire. Nineteenth visual indicator 438 can indicate a vegetation density relative to a number of claims with respect to a fire. Twentieth visual indicator 440 can indicate a years of construction relative to a number of claims with respect to a fire. Referring to FIG. 4D, twenty-first visual indicator 442 can indicate a distance to tree relative to a number of claims with respect to a fire. Twenty-second visual indicator 444 can indicate a roof complexity (e.g., number of roof facades) relative to a number of claims with respect to a fire. Twenty-third visual indicator 446 can indicate a roof material relative to a number claims with respect to a fire. In some implementations, each visual indicator as described above can be generated for display, at a GUI, in association with an event prediction. For example, where an event prediction is associated with a fire, each of the fire-related visual indicators may be presented in conjunction with the event prediction. It should be noted, that other visual indicators can exist and that such visual indicators are merely examples.

User-Interactive Features of the Smart Property Analytics Platform

Figure 5A:
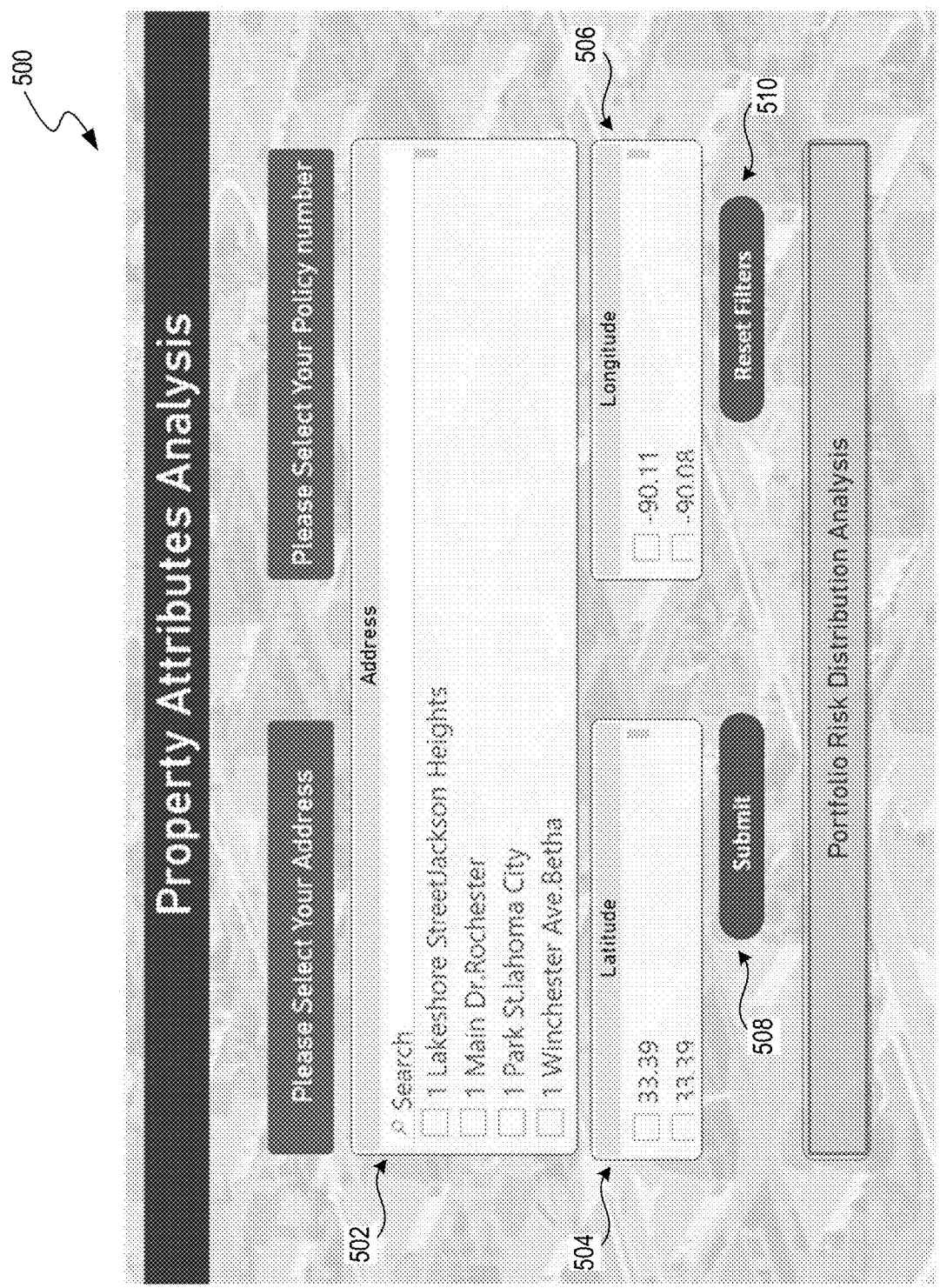
Figure 5C:
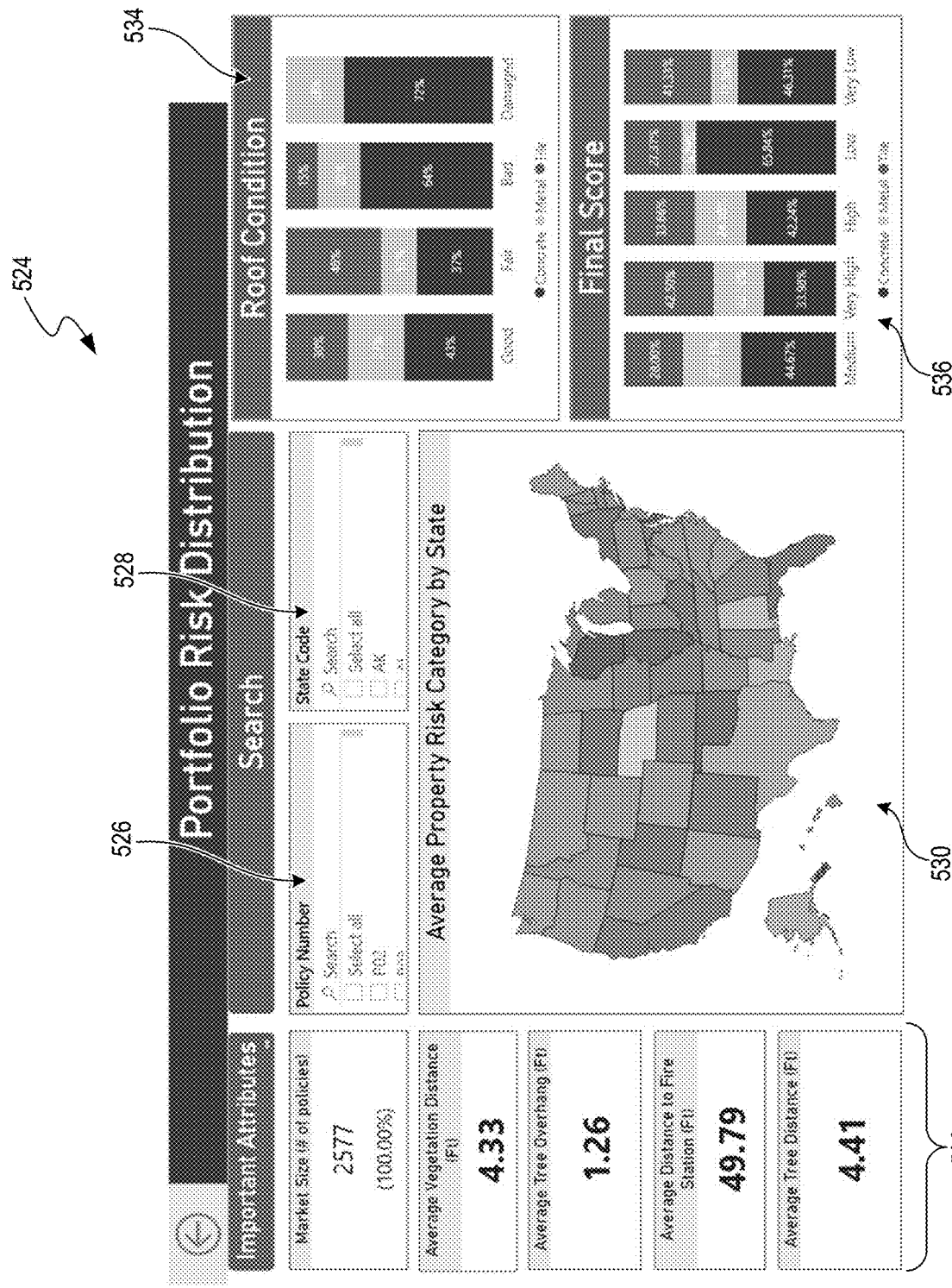

FIGS. 5A-5C show example system user interfaces displaying information associated with event predictions, in accordance with some implementations of the present technology. For instance, referring to FIG. 5A, a user can be presented with user interface 500 to generate one or more event predictions associated with a location of interest, in accordance with some implementations of the present technology. As an example, the user interface 500 may be the same or similar to the user interface discussed in 202 (FIG. 2A).

In some implementations, a user can use search bar 502 to provide a location information associated with a location of interest. For example, the location information may be an address, a policy number associated with a location of interest, GPS coordinates, or other location information. In some implementations, a user can interact with latitude selection box 504 and/or longitude selection box 506 to select a latitude/longitude of a location of interest. By providing a latitude and longitude of a location of interest, the system accurately identifies an exact location of interest as opposed to determining a location of interest via location information provided by the search bar 502. The user can select either submit button 508 to display one or more event predictions or information associated with the location of interest, or reset button 510 to reset information provided in search bar 502, latitude selection box 504, or longitude selection box 506.

Referring to FIG. 5B, a property specific attributes user interface 512 can be presented indicating attributes of the selected location of interest, event predictions associated with the location of interest, or other information. For example, a user may want to view information associated with the location of interest. As discussed above with respect to 212 (FIG. 2A), attributes of the location of interest can be displayed via the user interface. For example, property specific attributes user interface 512 can include policy details 514, property attributes 516, claim details 518, latest image 520, past image 522, or other information. Policy details 514 can include insurance policy information that is associated with the location of interest such as a policy number, address, date of inception (e.g., date at which the policy was executed) and a renewal date (e.g., the date at which the insurance policy is to be renewed). Property attributes 516 can indicate one or more location attributes, image-based attributes, or derived attributes as discussed with respect to process 200. Moreover, property attributes 516 can include one or more event predictions, such as risk event predictions data, severity event predictions data, or frequency event predictions data. For instance, as shown in FIG. 5B, property attributes 516 can include a roof type, a condition of a roof, an area (e.g., footprint of the residence associated with the location of interest), roof material, distance to vegetation (quantitative or qualitative), a tree overhang distance, distance to trees, distance to a fire station, distance to a closest building associated with the location of interest, an overall risk score, or other information. Claim details 518 can indicate a claim number identifier of the latest claim associated with the location of interest, a claim number identifier of an earlier claim associated with the location of interest, when a given claim was filed date, and when a given claim was closed date. Additionally, latest image 520 can be an up-to-date image of the location of interest and the past image 522 can be an older image of the location of interest. By presenting such information in a graphical user interface, a user is enabled to view all relevant insurance related information pertaining to a location of interest, thereby improving the user experience as the user is able to make more informed decisions related to the risk underwriting or damage assessment with respect to the location of interest.

Referring to FIG. 5C, a portfolio risk distribution user interface 524 can be presented. For instance, to enable users, such as insurance adjusters to view an overall view of all insurance policy-related information across insured applicants, portfolio risk distribution user interface 524 can be presented to enable insurance adjusters to view high-level data of their applicants. For example, portfolio risk distribution user interface 524 may present information related to all locations of interest selected with respect to a geographic area. For instance, as shown in FIG. 5C, insurance related information across the United States may be presented based on all available insurance information of insured applicants of the smart property analytics platform 108 (FIG. 1). For example, the portfolio risk distribution user interface 524 can present such information based on data obtained from the local data store or one or more remote data stores associated with the smart property analytics platform 108. Such information can be generated and presented similar to that of process 200, albeit, with respect to all locations of interest available. As such, portfolio risk distribution user interface 524 can present average attribute values 532 for all locations of interest, such as average vegetation distance, average tree overhang, average distance to fire station, and average tree distance. Portfolio risk distribution user interface 524 can also include a policy number search bar 526 to narrow down a particular policy number and a state code search bar 528 to narrow down information to a given state. Portfolio risk distribution user interface 524 can also include an average roof condition 534 for a given roofing material and a type of roof distribution 536 with respect to a given roofing material. Additionally, portfolio risk distribution user interface 524 can also include an average property risk category by state distribution 530 indicating a color coded risk for locations of interest of respective geographic areas (e.g., states). By providing such a high level view of insurance-related information across all insured locations of interest, an insurance adjuster may make more informed decisions as to which geographic areas to focus on when providing insurance coverage advice, thereby improving the user experience.

Computing System Environments

Figure 6:
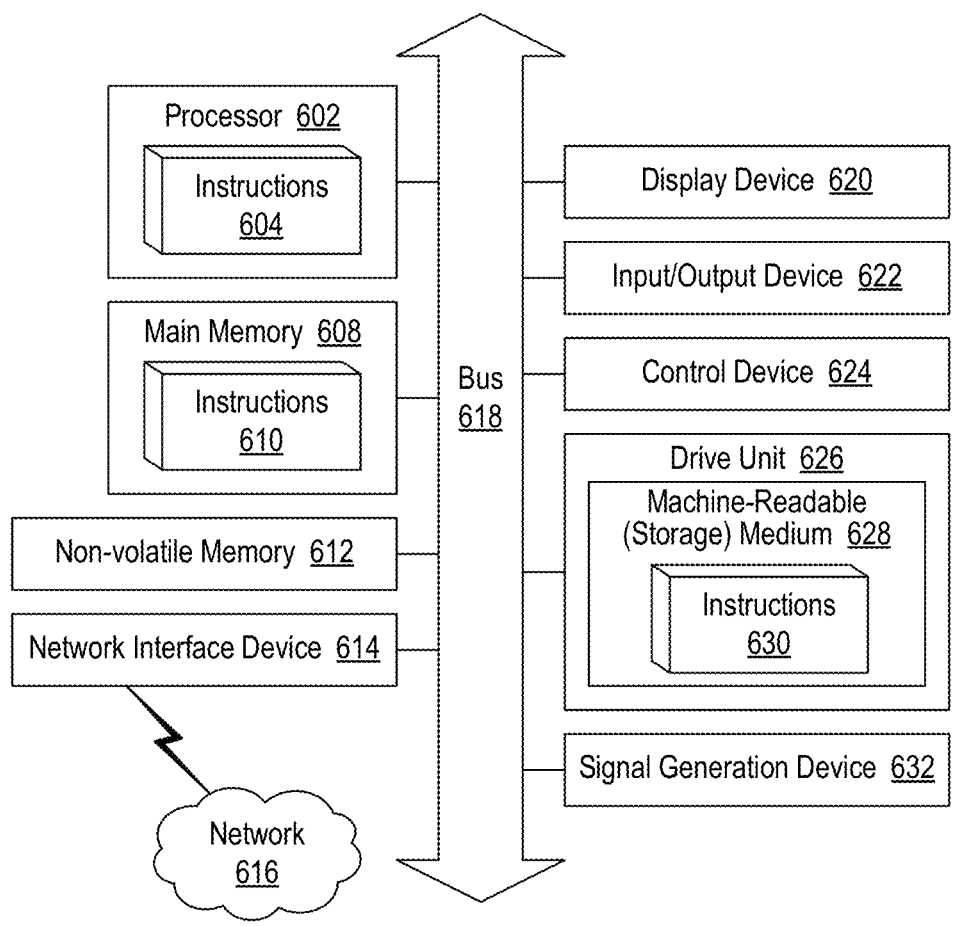
FIG. 6 shows a block diagram that illustrates an example of a computer system 600 in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a machine-readable medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computer system 600 to exchange data in a network 614 with an entity that is external to the computing system 600 through any communication protocol supported by the computer system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Networked Computing Environments

Figure 7:
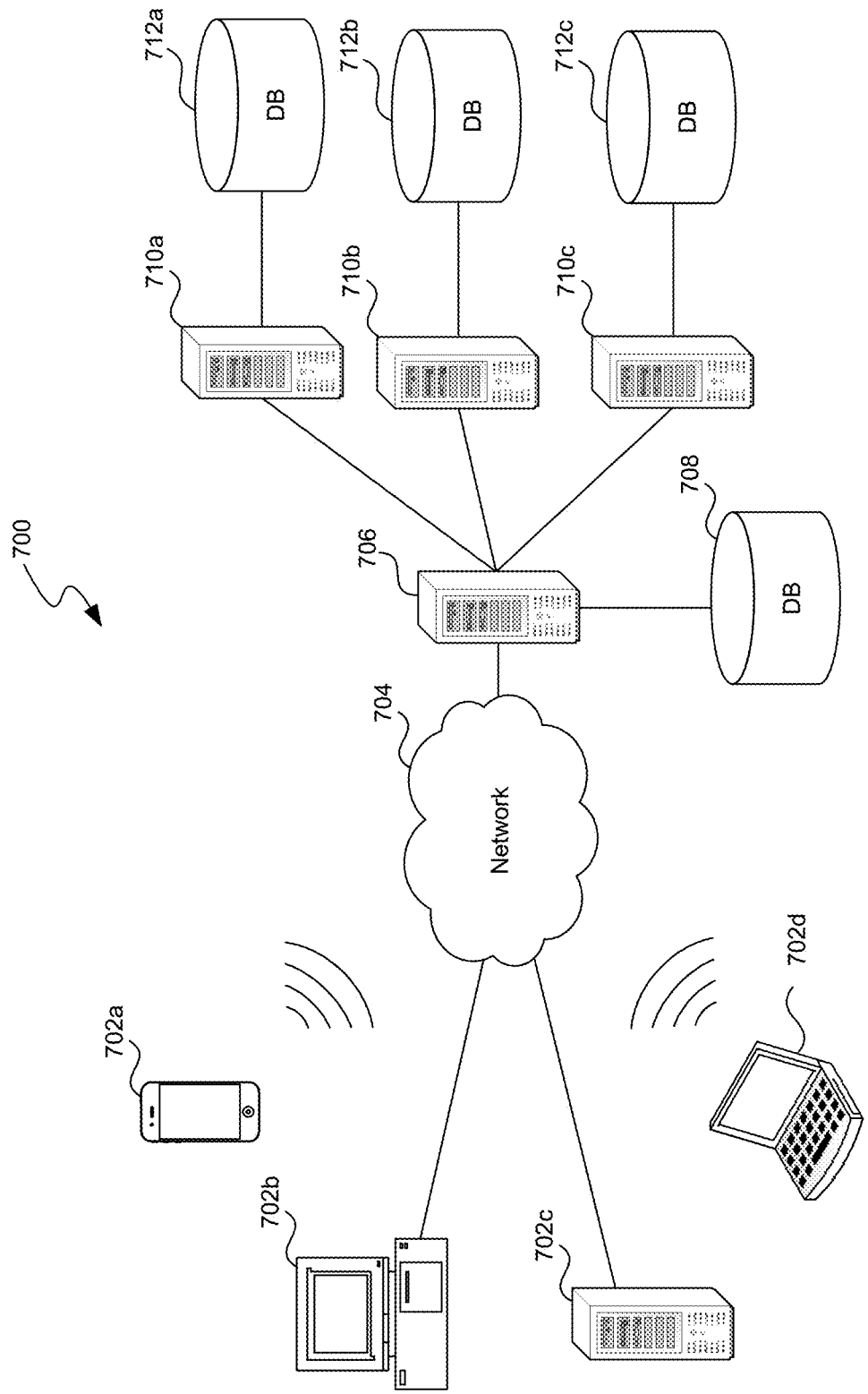
FIG. 7 shows a system diagram illustrating an example of a computing environment in which the disclosed system operates in some implementations.

FIG. 7 is a system diagram illustrating an example of a computing environment in which the disclosed system operates in some implementations. In some implementations, environment 700 includes one or more client computing devices 702a-d, examples of which can host the smart property analytics platform 108. For example, the computing devices 702a-d can comprise distributed entities a-d, respectively. Client computing devices 702 operate in a networked environment using logical connections through network 704 to one or more remote computers, such as a server computing device. In some implementations, client computing devices 702 may correspond to client device 104 (FIG. 1).

In some implementations, server computing device 706 is an edge server which receives client requests and coordinates fulfillment of those requests through other servers, such as servers 710a-c. In some implementations, server computing devices 706 and 710 comprise computing systems, such as the computing environment 100. Though each server computing device 706 and 710 is displayed logically as a single server, server computing devices can each be a distributed computing environment encompassing multiple computing devices located at the same or at geographically disparate physical locations. In some implementations, each server computing device 710 corresponds to a group of servers.

Client computing devices 702 and server computing devices 706 and 710 can each as a server or client to other server or client devices. In some implementations, server computing devices (706, 710a-c) connect to a corresponding database (708, 712a-c). As discussed above, each server 710 can correspond to a group of servers, and each of these servers can share a database or can have its own database. Databases 708 and 712 warehouse (e.g., store) information such model data, training data, test data, validation data, one or more machine learning models, predefined ranges, predefined thresholds, error thresholds, graphical representations, data structures, location identifiers, images, multimedia, videos, location attributes, weather data, policy data, insurance policy data, insurance claim data, demographic information, environmental information, data recency criteria, threshold conditions, threshold values, image-based attributes, similar locations, historical event predictions, risk levels, risk values, distances between objects, predicted costs, amounts, numbers, iterative-imputer operations or algorithms, k-bins discretizer operations or algorithms, encoding algorithms, catboost encoder operations or algorithms, isolation forest operations or algorithms, cognitive models, visual indicators, graphical elements, severity levels, or other information.

The one or more machine learning models can include supervised learning models, unsupervised learning models, semi-supervised learning models, and/or reinforcement learning models. Examples of machine learning models suitable for use with the present technology include, but are not limited to: regression algorithms (e.g., ordinary least squares regression, linear regression, logistic regression, stepwise regression, multivariate adaptive regression splines, locally estimated scatterplot smoothing), instance-based algorithms (e.g., k-nearest neighbor, learning vector quantization, self-organizing map, locally weighted learning, support vector machines), regularization algorithms (e.g., ridge regression, least absolute shrinkage and selection operator, elastic net, least-angle regression), decision tree algorithms (e.g., classification and regression trees, Iterative Dichotomiser 3 (ID3), C4.5, C5.0, chi-squared automatic interaction detection, decision stump, M5, conditional decision trees), Bayesian algorithms (e.g., naïve Bayes, Gaussian naïve Bayes, multinomial naïve Bayes, averaged one-dependence estimators, Bayesian belief networks, Bayesian networks), clustering algorithms (e.g., k-means, k-medians, expectation maximization, hierarchical clustering), association rule learning algorithms (e.g., apriori algorithm, ECLAT algorithm), artificial neural networks (e.g., perceptron, multilayer perceptrons, back-propagation, stochastic gradient descent, Hopfield networks, radial basis function networks), deep learning algorithms (e.g., convolutional neural networks, recurrent neural networks, long short-term memory networks, stacked auto-encoders, deep Boltzmann machines, deep belief networks), dimensionality reduction algorithms (e.g., principle component analysis, principle component regression, partial least squares regression, Sammon mapping, multidimensional scaling, projection pursuit, discriminant analysis), time series forecasting algorithms (e.g., exponential smoothing, autoregressive models, autoregressive with exogenous input (ARX) models, autoregressive moving average (ARMA) models, autoregressive moving average with exogenous inputs (ARMAX) models, autoregressive integrated moving average (ARIMA) models, autoregressive conditional heteroskedasticity (ARCH) models), blackboard machine learning models, and ensemble algorithms (e.g., boosting, bootstrapped aggregation, AdaBoost, blending, stacking, gradient boosting machines, gradient boosted trees, random forest).

In various implementations, the one or more machine learning models can be trained on training data or a training set. The training data or training set can be created by generating pairs of features (e.g., feature vectors) and/or ground-truth labels/values based on any of the data stored in databases 708 and/or 712. During training, the machine learning models can be adjusted or modified to fit the models to the training data by, for example, adjusting or modifying model parameters, such as weights and/or biases, so as to minimize some error measure (e.g., a difference between a predicted value and an actual/ground-truth value) over the training data. The error measure can be evaluated using one or more loss functions. Examples of loss functions that can be used include, but are not limited to, cross-entropy loss, log loss, hinge loss, mean square error, quadratic loss, L2 loss, mean absolute loss, L1 loss, Huber loss, smooth mean absolute error, log-cosh loss, or quantile loss. The trained machine learning models can be applied to test data or validation data (e.g., holdout dataset) to generate predictions (e.g., predicted values or labels). The test data or validation data can also come from data that is stored in databases 708 and/or 712 (e.g., unlabeled data to generate predictions for). In some implementations, the machine learning models can be retrained to further modify/adjust model parameters and improve model performance. The machine learning models can be retrained on existing and/or new training data, training data, or validation data so as to fine-tune the model parameters to better fit the data and yield a different error measure over the data (e.g., further minimization of the error, or to increase the error to prevent overfitting). More specifically, the model can be further adjusted or modified (e.g., fine-tuned model parameters such as weights and/or biases) so as to alter the yielded error measure. Such retraining can be performed iteratively whenever it is determined that adjustments or modifications to the machine learning models are desirable.

Though databases 708 and 712 are displayed logically as single units, databases 708 and 712 can each be a distributed computing environment encompassing multiple computing devices, can be located within their corresponding server, or can be located at the same or at geographically disparate physical locations.

Network 704 can be a local area network (LAN) or a wide area network (WAN), but can also be other wired or wireless networks. In some implementations, network 704 is the Internet or some other public or private network. Client computing devices 702 are connected to network 704 through a network interface, such as by wired or wireless communication. While the connections between server computing device 706 and server computing device 710 are shown as separate connections, these connections can be any kind of local, wide area, wired, or wireless network, including network 704 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computer-implemented method comprising:
   receiving, via a graphical user interface (GUI), a user input indicating a location identifier of a location of interest;
   querying a first data store based on the location identifier to determine whether at least one image of a set of images associated with the location of interest satisfies a data recency criterion;
   in response to a determination that the at least one image of the set of images associated with the location of interest fails to satisfy the data recency criterion, querying a remote data store based on the location identifier to determine whether at least one image of a different set of images associated with the location of interest satisfies the data recency criterion;
   in response to the at least one image of the different set of images associated with the location of interest satisfying the data recency criterion, extracting, by a first machine learning model, one or more image-based attributes from the at least one image of the different set of images associated with the location of interest;
   determining, by a second machine learning model, a distance between a first object of the at least one image of the different set of images and a second object of the at least one image of the different set of images;
   using a set of training data comprising a set of image-based attributes, a set of distance values, and a set of location attributes for a particular training location, training a third machine learning model to generate sets of predictions by correlating at least one particular location attribute in the set of location attributes to at least one particular predictor from (a) the set of image-based attributes or (b) the set of distance values;
   causing the third machine learning model to generate an event prediction by providing (i) the one or more image-based attributes, (ii) the distance, and (iii) a set of location attributes associated with the location of interest to the third machine learning model, wherein the event prediction is associated with an environmental event;
   retraining the third machine learning model using (i) the generated event prediction and (ii) reference feedback information relating to the generated event prediction, wherein the third machine learning model includes a neural network, and
   wherein retraining the third machine learning model causes the third machine learning model to update a set of weights associated with a set of nodes in the neural network to minimize an error measure between the generated event prediction and the reference feedback information; and
   generating for display, at the GUI, information associated with the event prediction.

2. The method of claim 1, further comprising:
   determining a set of similar locations to the location of interest by comparing a first attribute in the set of location attributes associated with the location of interest to a second attribute in a set of location attributes associated with a different set of locations; and
   determining, for each similar location of the set of similar locations, by the second machine learning model, a second distance between (i) a first object of a respective similar location and (ii) a second object of the respective similar location, of at least one image associated with the respective similar location.

3. The method of claim 2, wherein the event prediction is a risk event prediction, and wherein generating the risk event prediction further comprises:
   causing the third machine learning model to generate the risk event prediction, by providing to the third machine learning model (i) the one or more image-based attributes, (ii) the distance, (iii) the set of location attributes associated with the location of interest, and (iv) the second distance for each similar location of the set of similar locations, wherein the risk event prediction indicates a level of risk of an first environmental event associated with the location of interest with respect to each similar location of the set of similar locations.

4. The method of claim 2, wherein the event prediction is a severity event prediction, and wherein generating the severity event prediction further comprises:
   determining, for each similar location of the set of similar locations, one or more insurance claims, wherein each insurance claim is associated with an environmental event;
   extracting, from the one or more insurance claims, one or more claim attributes; and
   causing the third machine learning model to generate the severity event prediction by providing to the third machine learning model (i) the one or more image-based attributes, (ii) the distance, (iii) the set of location attributes associated with the location of interest, (iv) the second distance for each similar location of the set of similar locations, and (v) the one or more claim attributes of the similar locations, wherein the severity event prediction indicates a predicted cost associated with a first environmental event associated with the location of interest with respect to each similar location of the set of similar locations.

5. The method of claim 1, wherein the one or more image-based attributes comprise one or more of environmental attribute information or attributes of a property associated with the location of interest, and wherein, prior to providing the attributes to the third machine learning model, performing attribute pre-processing, comprising at least one of:
   generating missing values by executing an iterative imputer-based operation;
   determining one or more outliers of the one or more image-based attributes by executing an isolation forest-based operation;
   binning the one or more image-based attributes by executing a k-bins discretizer-based operation;
   generating one or more attribute values corresponding to respective image-based attributes of the one or more image-based attributes by determining one or more dates associated with the set of location attributes associated with the location of interest; or
   performing an encoding of the one or more image-based attributes by executing a catboost encoder-based operation.

6. A system, the system comprising:
   at least one processor communicatively coupled to a remote data store that provides first information related to a first set of locations, wherein each location of the first set of locations is associated with (i) a first location identifier and (ii) a first set of images;

a data store that provides second information related to a second set of locations, wherein each location of the second set of locations are associated with (i) a second location identifier, (ii) a second set of images, and (iii) a set of location attributes; and at least one memory coupled to the at least one processor and storing instructions that, when executed by the at least one processor, perform operations comprising:

receiving, via a graphical user interface (GUI), a user input indicating a location identifier of a location of interest;

querying the data store based on the location identifier of the location of interest to determine whether at least one image of the second set of images associated with the location of interest satisfies a data recency criterion;

in response to a determination that the at least one image of the second set of images fails to satisfy the data recency criterion, querying the remote data store based on the location identifier of the location of interest to determine whether at least one image of the first set of images associated with the location of interest satisfies the data recency criterion;

in response to the at least one image of the first set of images associated with the location of interest satisfying the data recency criterion, extracting, by a cognitive image analysis model, one or more image-based attributes from the at least one image of the first set of images associated with the location of interest;

computing, by an object recognition model, a distance between a first object of interest of the at least one image and a second object of interest of the at least one image;

using a set of training data comprising a set of image-based attributes, a set of distance values, and a set of location attributes for a particular training location, training a third machine learning model to generate sets of predictions by correlating at least one particular location attribute in the set of location attributes to at least one particular predictor from (a) the set of image-based attributes or (b) the set of distance values;

causing the third machine learning model to generate an event prediction by providing (i) the one or more image-based attributes, (ii) the distance, and (iii) and a set of location attributes associated with the location of interest to the third machine learning model, wherein the event prediction is associated with an environmental event;

retraining the third machine learning model using (i) the generated event prediction and (ii) reference feedback information relating to the generated event prediction, wherein the third machine learning model includes a neural network, and wherein retraining the third machine learning model causes the third machine learning model to update a set of weights associated with a set of nodes in the neural network to minimize an error measure between the generated event prediction and the reference feedback information; and generating for display, at the GUI, information associated with the event prediction.

7. The system of claim 6, wherein the distance is a geographical distance between the location of interest and at least one of vegetation, a fire station, a body of water, or a road.

8. The system of claim 6, wherein the distance is a distance between a first residence feature of a residence associated with the location of interest and a second residence feature of the residence associated with the location of interest.

9. The system of claim 6, wherein the instructions, when executed by the at least one processor, further perform operations comprising:

determining a set of similar locations to the location of interest by comparing a first attribute in the set of location attributes associated with the location of interest to a second attribute in the set of location attributes associated with the second set of locations; and determining, for each similar location of the set of similar locations, by the object recognition model, a second distance between (i) a first object of interest of a respective similar location and (ii) a second object of interest of the respective similar location, of at least one image associated with the respective similar location.

10. The system of claim 9, wherein the event prediction is a risk event prediction, and wherein generating the risk event prediction further comprises:

causing the third machine learning model to generate the risk event prediction, by providing to the third machine learning model (i) the one or more image-based attributes, (ii) the distance, (iii) the set of location attributes associated with the location of interest, and (iv) the second distance for each similar location of the set of similar locations, wherein the risk event prediction indicates a level of risk of an first environmental event associated with the location of interest with respect to each similar location of the set of similar locations.

11. The system of claim 9, wherein the event prediction is a severity event prediction, and wherein generating the severity event prediction further comprises:

determining, for each similar location of the set of similar locations, one or more insurance claims, wherein each insurance claim is associated with an environmental event;

extracting, from the one or more insurance claims, one or more claim attributes; and causing the third machine learning model to generate the severity event prediction by providing to the third machine learning model (i) the one or more image-based attributes, (ii) the distance, (iii) the set of location attributes associated with the location of interest, (iv) the second distance for each similar location of the set of similar locations, and (v) the one or more claim attributes of the similar locations, wherein the severity event prediction indicates a predicted cost associated with a first environmental event associated with the location of interest with respect to each similar location of the set of similar locations.

12. The system of claim 6, wherein the one or more image-based attributes comprise one or more of environmental attribute information or attributes of a property associated with the location of interest, and wherein, prior to providing the attributes to the third machine learning model, the at least one processor performs attribute pre-processing, comprising at least one of:

generating missing values by executing an iterative imputer-based operation;

determining one or more outliers of the one or more image-based attributes by executing an isolation forest-based operation;

binning the one or more image-based attributes by executing a k-bins discretizer-based operation;

generating one or more attribute values corresponding to respective image-based attributes of the one or more image-based attributes by determining one or more dates associated with the set of location attributes associated with the location of interest; or performing an encoding of the one or more image-based attributes by executing a catboost encoder-based operation.

13. The system of claim 6, wherein the location attributes associated with the location of interest comprise one or more of historical policy information, historical weather event information, or attributes of a property associated with the location.

14. The system of claim 6, wherein the instructions when executed by the at least one processor further perform operations comprising:

in response to the at least one image of the second set of images satisfying the data recency criterion, extracting, by the cognitive image analysis model, one or more second image-based attributes from the at least one image of the second set of images;

determining, by the object recognition model, a second distance between a first object of the at least one image of the second set of images and a second object of the at least one image of the second set of images;

causing the third machine learning model to generate a second event prediction, by providing (i) the one or more second image-based attributes, (ii) the second distance, and (iii) the set of location attributes associated with the location of interest to the third machine learning model, wherein the event prediction is associated with a second category of environmental events; and generating and displaying, at the GUI, one or more second visual indicators associated with the second event prediction.

15. The system of claim 6, wherein the instructions when executed by the at least one processor further perform operations comprising:

comparing the set of location attributes associated with the location of interest to the one or more image-based attributes to determine whether a first value associated with a first location attribute fails to match a second value associated with a corresponding image-based attribute;

identifying a first date-of-update associated with the first location attribute and a second date-of-update associated with the corresponding image-based attribute;

determining whether the first date-of-update is older than the second date-of-update; and in response to the first date-of-update being older than the second date-of-update, updating the value associated with the first location attribute with the value associated with the corresponding image-based attribute.

16. The system of claim 6, wherein the instructions when executed by the at least one processor further perform operations comprising:

retrieving, from a communicatively coupled second data store, weather data associated with the location of interest by querying the communicatively coupled second data store;

extracting, from the weather data, a set of weather events satisfying a weather event recency criterion;

determining, from the set of weather events, a subset of severe weather events each satisfying a weather event severity criterion;

extracting, from the subset of severe weather events, one or more weather-based attributes; and generating, by the third machine learning model, the event prediction further from the one or more weather-based attributes.

17. One or more non-transitory computer-readable media comprising instructions that, when executed by one or more processors, cause the one or more processors to perform operations comprising:

receiving, via a graphical user interface (GUI), a user input indicating a location identifier of a location of interest;

querying a first data store to determine whether at least one image of a set of images associated with the location of interest satisfies a data recency criterion;

in response to a determination that the at least one image of the images associated with the location of interest fails to satisfy the data recency criterion, querying a remote data store to determine whether at least one image of a different set of images associated with the location of interest satisfies the data recency criterion;

in response to the at least one image of the different set of images associated with the location of interest satisfying the data recency criterion, extracting, by a first machine learning model, one or more image-based attributes from the at least one image of the different set of images associated with the location of interest;

determining, by a second machine learning model, a distance between a first object of the at least one image of the different set of images and a second object of the at least one image of the different set of images;

using a set of training data comprising a set of image-based attributes, a set of distance values, and a set of location attributes for a particular training location, training a third machine learning model to generate sets of predictions by correlating at least one particular location attribute in the set of location attributes to at least one particular predictor from (a) the set of image-based attributes or (b) the set of distance values;

causing the third machine learning model to generate an event prediction by providing (i) the one or more image-based attributes, (ii) the distance, and (iii) and a set of location attributes associated with the location of interest to the third machine learning model, wherein the event prediction is associated with an environmental event;

retraining the third machine learning model using (i) the generated event prediction and (ii) reference feedback information relating to the generated event prediction, wherein the third machine learning model includes a neural network, and wherein retraining the third machine learning model causes the third machine learning model to update a set of weights associated with a set of nodes in the neural network to minimize an error measure between the generated event prediction and the reference feedback information; and generating for display, at the GUI, information associated with the event prediction.

18. The media of claim 17, wherein the operations further comprise:

determining a set of similar locations to the location of interest by comparing a first attribute in the set of location attributes associated with the location of interest to a second attribute in a set of location attributes associated with a different set of locations; and determining, for each similar location of the set of similar locations, by the second machine learning model, a second distance between (i) a first object of a respective similar location and (ii) a second object of the respective similar location, of at least one image associated with the respective similar location.

19. The media of claim 18, wherein the event prediction is a risk event prediction, and wherein generating the risk event prediction further comprises:

causing the third machine learning model to generate the risk event prediction, by providing to the third machine learning model (i) the one or more image-based attributes, (ii) the distance, (iii) the set of location attributes associated with the location of interest, and (iv) the second distance for each similar location of the set of similar locations, wherein the risk event prediction indicates a level of risk of an first environmental event associated with the location of interest with respect to each similar location of the set of similar locations.

20. The media of claim 18, wherein the event prediction is a severity event prediction, and wherein generating the severity event prediction further comprises:

determining, for each similar location of the set of similar locations, one or more insurance claims, wherein each insurance claim is associated with an environmental event;

extracting, from the one or more insurance claims, one or more claim attributes; and causing the third machine learning model to generate the severity event prediction by providing to the third machine learning model (i) the one or more image-based attributes, (ii) the distance, (iii) the set of location attributes associated with the location of interest, (iv) the second distance for each similar location of the set of similar locations, and (v) the one or more claim attributes of the similar locations, wherein the severity event prediction indicates a predicted cost associated with a first environmental event associated with the location of interest with respect to each similar location of the set of similar locations.

\* \* \* \* \*